(12) United States Patent
Kamiyama

(10) Patent No.: US 9,694,626 B2
(45) Date of Patent: Jul. 4, 2017

(54) VEHICLE WHEEL

(71) Applicant: HONDA MOTOR CO., LTD., Minato-ku, Tokyo (JP)

(72) Inventor: Youichi Kamiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/652,213

(22) PCT Filed: Dec. 17, 2012

(86) PCT No.: PCT/JP2012/082611
§ 371 (c)(1),
(2) Date: Jun. 15, 2015

(87) PCT Pub. No.: WO2014/097363
PCT Pub. Date: Jun. 26, 2014

(65) Prior Publication Data
US 2015/0321509 A1    Nov. 12, 2015

(51) Int. Cl.
*B60B 21/02* (2006.01)
*B60B 21/12* (2006.01)
*G10K 11/172* (2006.01)

(52) U.S. Cl.
CPC .......... *B60B 21/026* (2013.01); *B60B 21/025* (2013.01); *B60B 21/12* (2013.01); *G10K 11/172* (2013.01); *B60B 21/028* (2013.01); *B60B 2900/131* (2013.01); *B60B 2900/133* (2013.01)

(58) Field of Classification Search
CPC ..... B60B 21/026; B60B 21/025; B60B 21/12; B60B 21/028; B60B 2900/131; B60B 2900/133; G10K 11/172

USPC ...... 152/381.5, 381.6, 400, 516, 520, 154.1; 301/6.91
See application file for complete search history.

(56) References Cited

U.S. PATENT DOCUMENTS

| | | | |
|---|---|---|---|
| 6,422,655 B1 * | 7/2002 | Britton | B60C 19/002 152/153 |
| 6,516,849 B2 * | 2/2003 | Flament | B60C 3/06 152/381.5 |
| 7,690,410 B2 * | 4/2010 | Kamiyama | B60B 3/044 152/381.5 |
| 7,896,043 B2 | 3/2011 | Kashiwai et al. | |
| 8,196,628 B2 * | 6/2012 | Fowler-Hawkins | B60C 19/002 152/339.1 |

(Continued)

FOREIGN PATENT DOCUMENTS

| | | |
|---|---|---|
| JP | 3776722 B2 | 5/2006 |
| JP | 2008-126806 A | 6/2008 |
| JP | 2009-074595 A | 4/2009 |

(Continued)

*Primary Examiner* — S. Joseph Morano
*Assistant Examiner* — Jean Charleston
(74) *Attorney, Agent, or Firm* — Carrier Blackman & Associates, P.C.; Joseph P. Carrier; Fulchand P. Shende

(57) ABSTRACT

This vehicle wheel is provided with only two sub air chamber members each as a Helmholtz resonator having an sub air chamber which communicates with a tire air chamber via a communication hole, and characterized in that the respective communication holes of the sub air chamber members are provided apart from each other in a wheel circumferential direction so as to form approximately a right angle around a wheel rotation center.

5 Claims, 16 Drawing Sheets

(56) References Cited

U.S. PATENT DOCUMENTS

2001/0007268 A1* 7/2001 Yukawa ............... B60B 21/023
152/381.6

FOREIGN PATENT DOCUMENTS

| JP | 2010-095147 A | 4/2010 |
| JP | 4551422 B2 | 9/2010 |
| JP | 4589812 B2 | 12/2010 |
| JP | 2012-051397 A | 3/2012 |

* cited by examiner

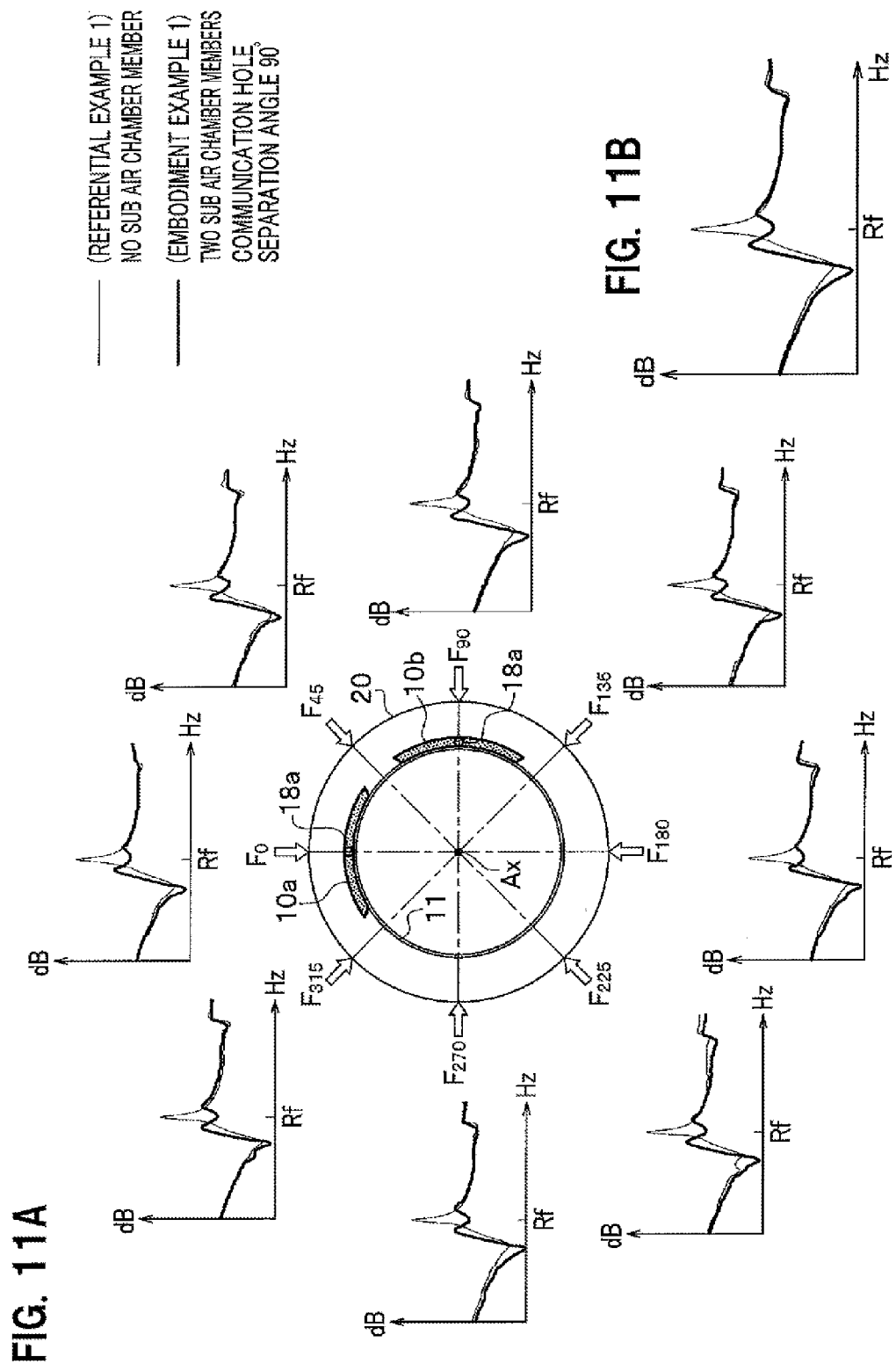

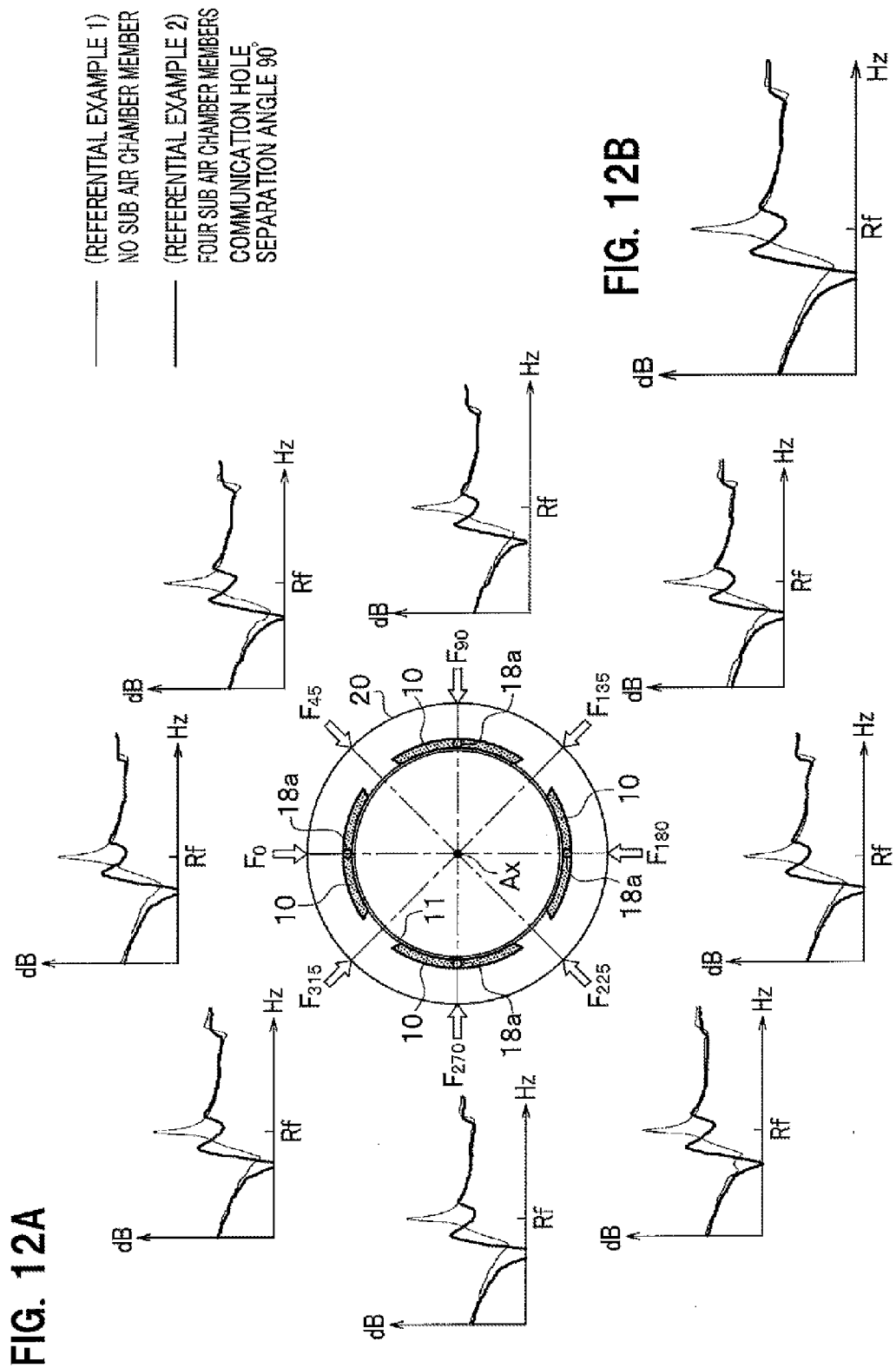

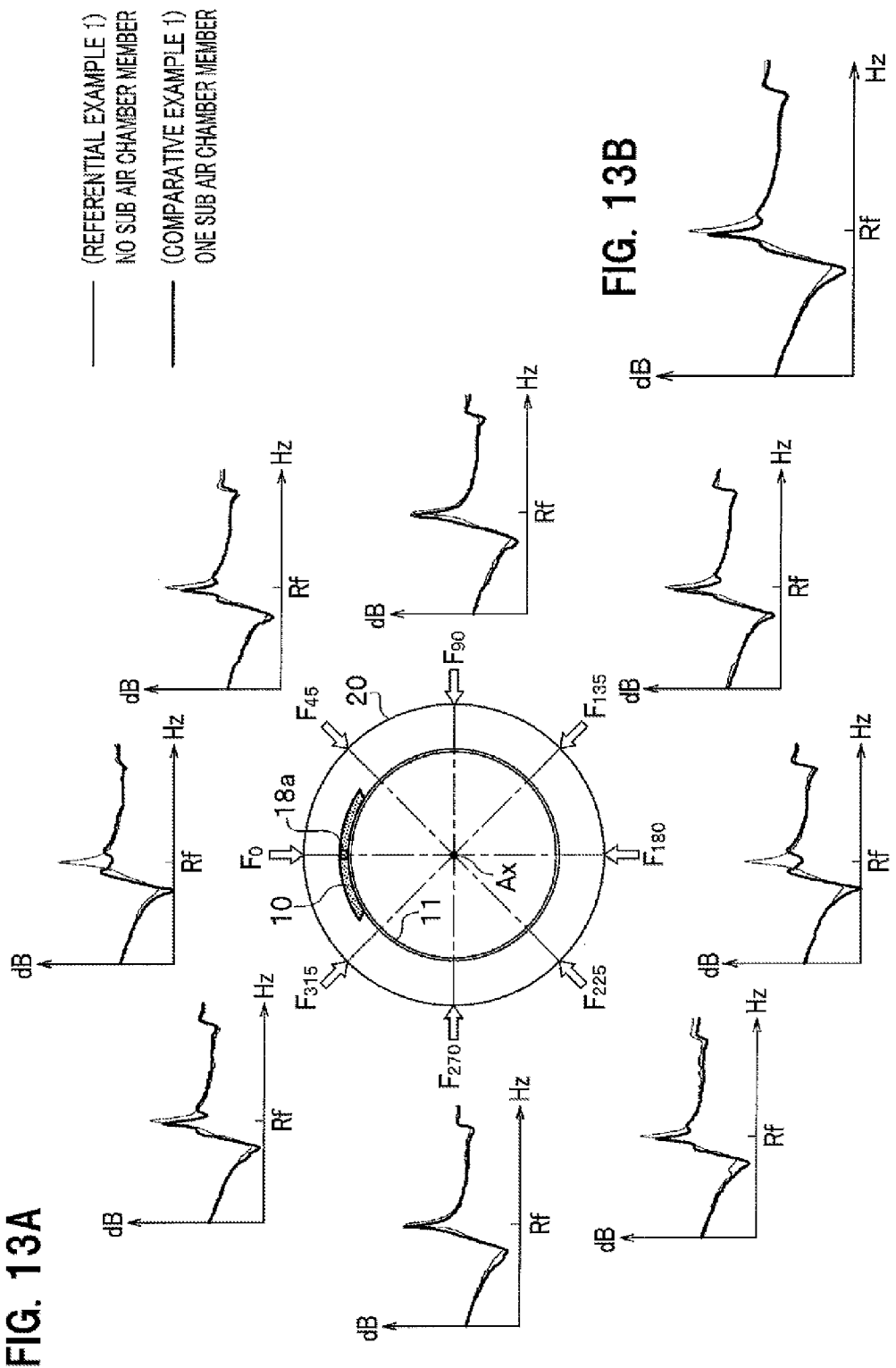

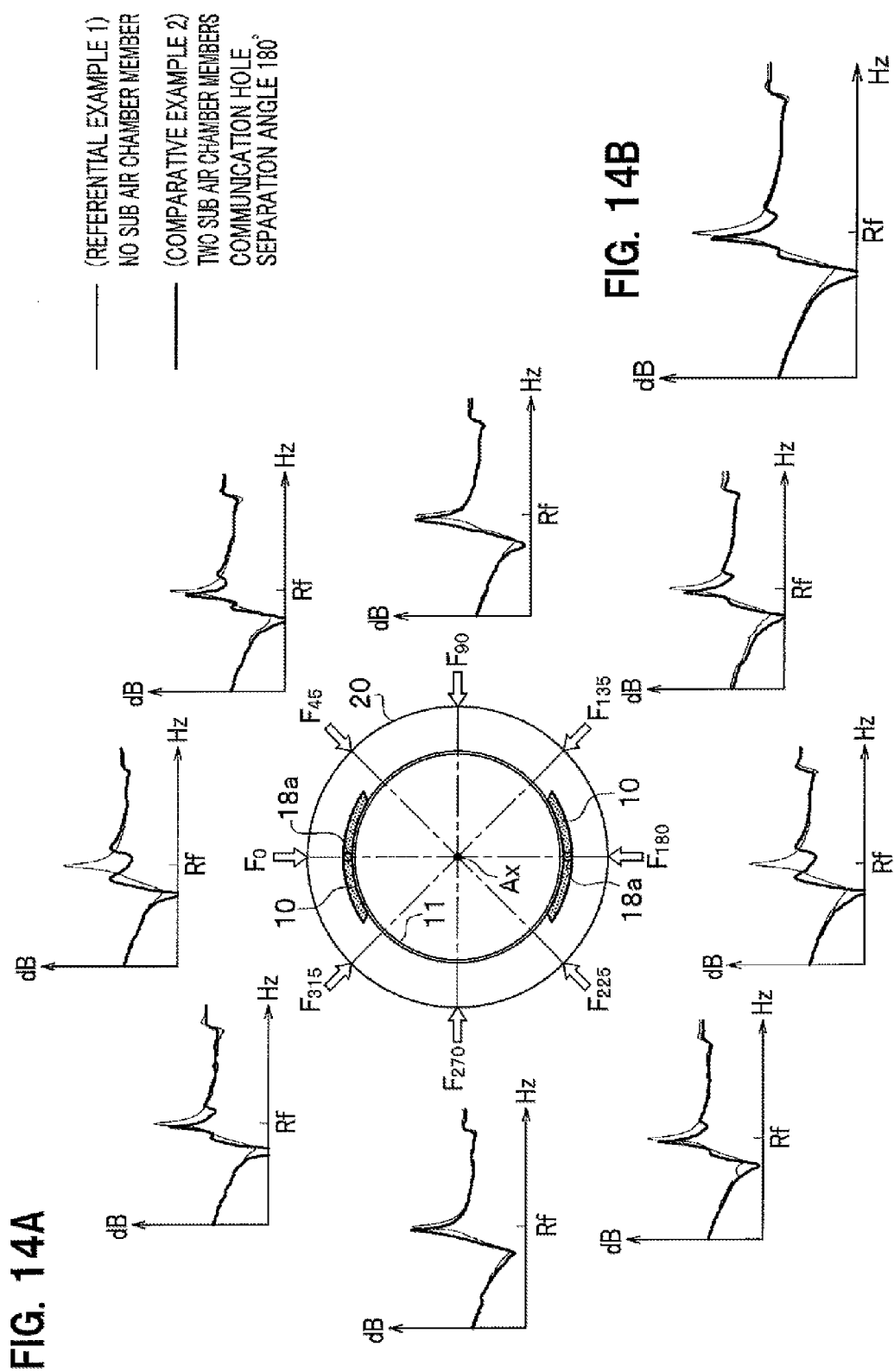

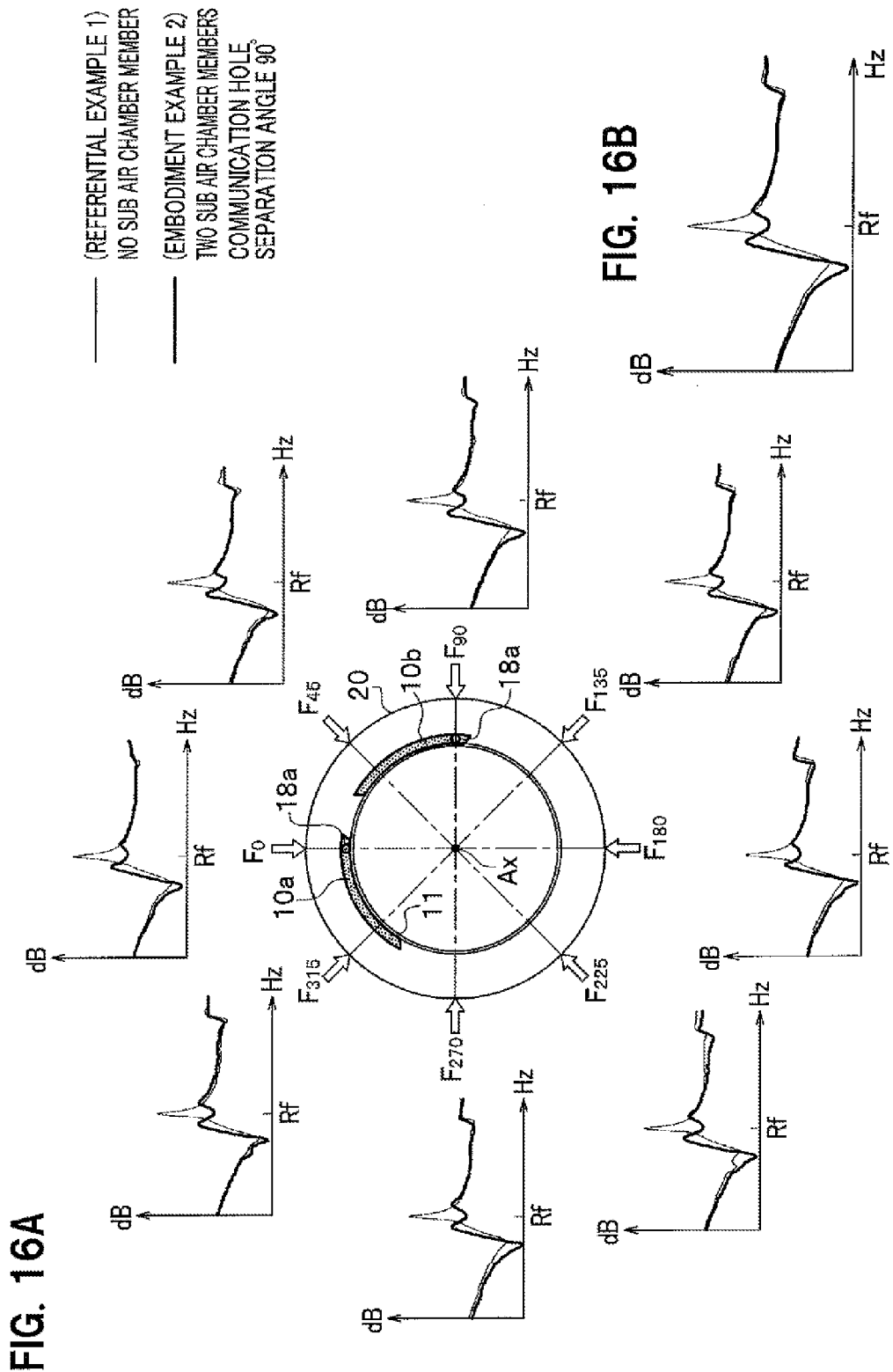

VEHICLE WHEEL

TECHNICAL FIELD

The present invention relates to a vehicle wheel.

BACKGROUND ART

It is known that air column resonance occurring in a tire air chamber formed between a tire and the rim of a wheel causes road noise of an automobile. Air column resonance refers to a resonance phenomenon that a random vibration input transmitted to a tire tread from a road surface during driving vibrates air in a tire air chamber wherein the resonance phenomenon occurs near the vibration frequency of air column resonance in the tire air chamber. This resonance phenomenon generates air column resonance sound in the tire air chamber. When air column resonance sound is generated in the tire air chamber, this air column resonance sound vibrates the wheel, and the vibration is transmitted to the vehicle body through a suspension and is felt as a road noise in the vehicle compartment.

As a wheel that reduces such a road noise, various ones provided with Helmholtz resonators, each having a sub air chamber which communicates with a tire air chamber via a communication hole, are presented (for example, refer to Patent Literatures 1 to 3).

Conventionally, such a wheel is often provided with more than three Helmholtz resonators at equal intervals along the circumferential direction of the wheel so that vibration applied by air column resonance sound can be sufficiently reduced. On the other hand, in order to reduce the manufacturing cost of a wheel, simplify the manufacturing process of the wheel, and reduce the weight of the wheel, reduction in the quantity of Helmholtz resonators is desired.

RELATED ART DOCUMENTS

Patent Literatures

Patent Literature 1: JP 3776722 B2
Patent Literature 2: JP 4551422 B2
Patent Literature 3: JP 4589812 B2

DISCLOSURE OF THE INVENTION

Problems to be Solved by the Invention

However, if the quantity of Helmholtz resonators provided in a wheel is reduced, vibration applied by air column resonance sound may be insufficiently reduced as described above. Concretely, for example, a wheel in which two Helmholtz resonators are arranged such as to face each other, sandwiching the rotation center, has a problem that, if a tire is attached to the wheel and the wheel is operated to rotate, the silencing effect virtually cannot be obtained when the tire tread comes in contact with the ground on the outer circumferential side at a part (between Helmholtz resonators along the wheel circumferential direction) where a Helmholtz resonator Is not provided. That is, with this wheel, depending on a position around the circumferential direction of the wheel, a so-called 'silencing irregularity', in which silencing of air column resonance sound is realized and not realized, occurs.

In this situation, in order to solve such problems, an object of the present invention is to provide a vehicle wheel, provided with Helmholtz resonators, that is free from silencing irregularity even if the quantity of Helmholtz resonators provided in a wheel is smaller than four, further enables a high silencing effect on air column resonance sound, and satisfactorily reduces road noise caused by air column resonance sound.

Means for Solving the Problems

A vehicle wheel according to the present invention having solved the above-described problems includes: two Helmholtz resonators each having a sub air chamber which communicates with a tire air chamber via a communication hole, wherein the respective communication holes of the Helmholtz resonators are arranged to be separated from each other along a wheel circumferential direction, forming a substantially right angle with each other around a wheel rotation center.

By this structure of a vehicle wheel, by the fact that the respective communication holes are separated from each other along the wheel circumferential direction such as to form a substantial right angle around the wheel rotation center, even when the quantity of Helmholtz resonators provided for the wheel is smaller than four, no unevenness of silencing occurs, a high silencing effect on air column resonance sound is obtained, and road noise due to air column resonance sound can be satisfactorily reduced. Thus, by the vehicle wheel, it is possible to attain reduction in the manufacturing cost, simplification of the manufacturing process, reduction in the wheel weight, and the like, compared with a conventional vehicle wheel.

Further, in this structure of a vehicle wheel, it is preferable that: the Helmholtz resonators are a first Helmholtz resonator and a second Helmholtz resonator that is disposed to be separated from the first Helmholtz resonator along the wheel circumferential direction such as to face the first Helmholtz resonator around the wheel rotation center; the communication hole of the first Helmholtz resonator is arranged at an end portion of the first Helmholtz resonator in a circumferential direction; and the communication hole of the second Helmholtz resonator is arranged at an end portion of the second Helmholtz resonator in the circumferential direction, the end portion being on a side adjacent to the communication hole of the first Helmholtz resonator.

By this structure of a vehicle wheel, as the first Helmholtz resonator and the second Helmholtz resonator are disposed such as to face each other around the wheel rotation center, the first Helmholtz resonator and the second Helmholtz resonator have a role of a counter weight for cancelling a wheel unbalance caused by providing Helmholtz resonators. Thus, a counter weight for facing Helmholtz resonators is unnecessary, which reduces an increase in the weight due to a counter weight used in correcting wheel unbalance.

In this structure of a vehicle wheel, it is preferable that the Helmholtz resonators are formed such that the first Helmholtz resonator and the second Helmholtz resonator are integrated with each other.

With this vehicle wheel, it is possible to further simplify the manufacturing process.

In this structure of a vehicle wheel, it is preferable that: the Helmholtz resonators are formed by a sub air chamber member disposed in the tire air chamber; the inside of the sub air chamber member is partitioned in two chambers to form a first sub air chamber and a second sub air chamber; the sub air chamber member includes the communication hole via which the first sub air chamber communicates with the tire air chamber and the communication hole via which the second sub air chamber communicates with the tire air chamber; the first sub air chamber and the communication hole of the first sub air chamber form the first Helmholtz resonator; and the second sub air chamber and the communication hole of the second sub air chamber form the second Helmholtz resonator.

By this structure of a vehicle wheel, as Helmholtz resonators are formed by a sub air chamber member disposed in the tire air chamber, the manufacturing process can be simplified, differently from a wheel (for example, refer to Patent Literature 1) for which Helmholtz resonators are formed at a conventional rim itself. Further, as the first sub air chamber and the second sub air chamber are formed inside the sub air chamber member, the quantity of components is reduced, and it is possible to attain further reduction in the manufacturing cost, simplification of the manufacturing process, reduction in the wheel weight, and the like.

In this structure of a vehicle wheel, it is preferable that: the Helmholtz resonators are formed by resin such as to be longitudinal in the wheel circumferential direction in a state that the Helmholtz resonators are disposed in the tire air chamber: and the inside of the sub air chamber member is partitioned such that the first sub air chamber and the second sub air chamber are formed next to each other in a wheel width direction.

By this structure of a vehicle wheel, as a partitioning wall for partitioning the first sub air chamber and the second sub air chamber from each other is formed such as to extend along the wheel circumferential direction, the strength of the sub air chamber member can be further improved.

Advantages of the Invention

According to the present invention, it is possible to provide a vehicle wheel, provided with Helmholtz resonators, that is free from silencing irregularity even if the quantity of Helmholtz resonators provided in a wheel is smaller than four, further enables a high silencing effect on air column resonance sound, and satisfactorily reduces road noise caused by air column resonance sound.

BRIEF DESCRIPTION OF THE DRAWINGS

FIG. 11A is a diagram showing the positions of a first sub air chamber member and a second sub air chamber member of a wheel in Embodiment 1 according to the present invention and the separation distance between the communication holes (the separation angle between communication holes), and also showing graphs representing the magnitudes of the vibration accelerations that respond at the wheel rotation center to respective shock loads ($F_0$ to $F_{315}$) input at certain positions along the circumferential direction of a tire tread, and FIG. 11B shows a graph representing the one circuit average of vibration accelerations at the wheel rotation center in response to the shock loads ($F_0$ to $F_{315}$) in FIG. 11A;

FIGS. 12A and 12B are illustrations of a vehicle wheel in Referential Example 2, wherein FIG. 12A is a diagram showing the positions of four sub air chamber members and the separation distances between the communication holes (the separation angles between communication holes), and also showing graphs representing the magnitudes of the vibration accelerations that respond at the wheel rotation center to respective shock loads ($F_0$ to $F_{315}$), and FIG. 12B is a graph representing the one circuit average of vibration accelerations at the wheel rotation center in response to the shock loads ($F_0$ to $F_{315}$) in FIG. 12A;

FIGS. 13A and 13B are illustrations of a vehicle wheel in Comparative Example 1, wherein FIG. 13A is a diagram showing the positions of a single air chamber member, and also showing graphs representing the magnitudes of the vibration accelerations that respond at the wheel rotation center to respective shock loads ($F_0$ to $F_{315}$), and FIG. 13B is a graph representing the one circuit average of vibration accelerations at the wheel rotation center in response to the shock loads ($F_0$ to $F_{315}$) in FIG. 13A;

FIG. 14A and FIG. 14B are illustrations of Comparative Example 2 wherein FIG. 14A shows a diagram showing the positions of two sub air chamber members and the separation distance between the communication holes (the separation angle between communication holes), and also shows graphs representing the magnitudes of the vibration accelerations that respond at the wheel rotation center to respective shock loads ($F_0$ to $F_{315}$), and FIG. 14B shows a graph representing the one circuit average of vibration accelerations at the wheel rotation center in response to the shock loads ($F_0$ to $F_{315}$) in FIG. 14A;

FIGS. 16A and 16B are illustrations of a vehicle wheel in Embodiment 2, wherein FIG. 16A is a diagram showing the positions of two air chamber members and the separation distance between the communication holes (the separation angle between communication holes), and also showing graphs representing the magnitudes of the vibration accelerations that respond at the wheel rotation center to respective shock loads ($F_0$ to $F_{315}$), and FIG. 16B shows a graph representing the one circuit average of vibration accelerations at the wheel rotation center in response to the shock loads ($F_0$ to $F_{315}$) in FIG. 16A.

EMBODIMENT FOR CARRYING OUT THE INVENTION

Figure 1:
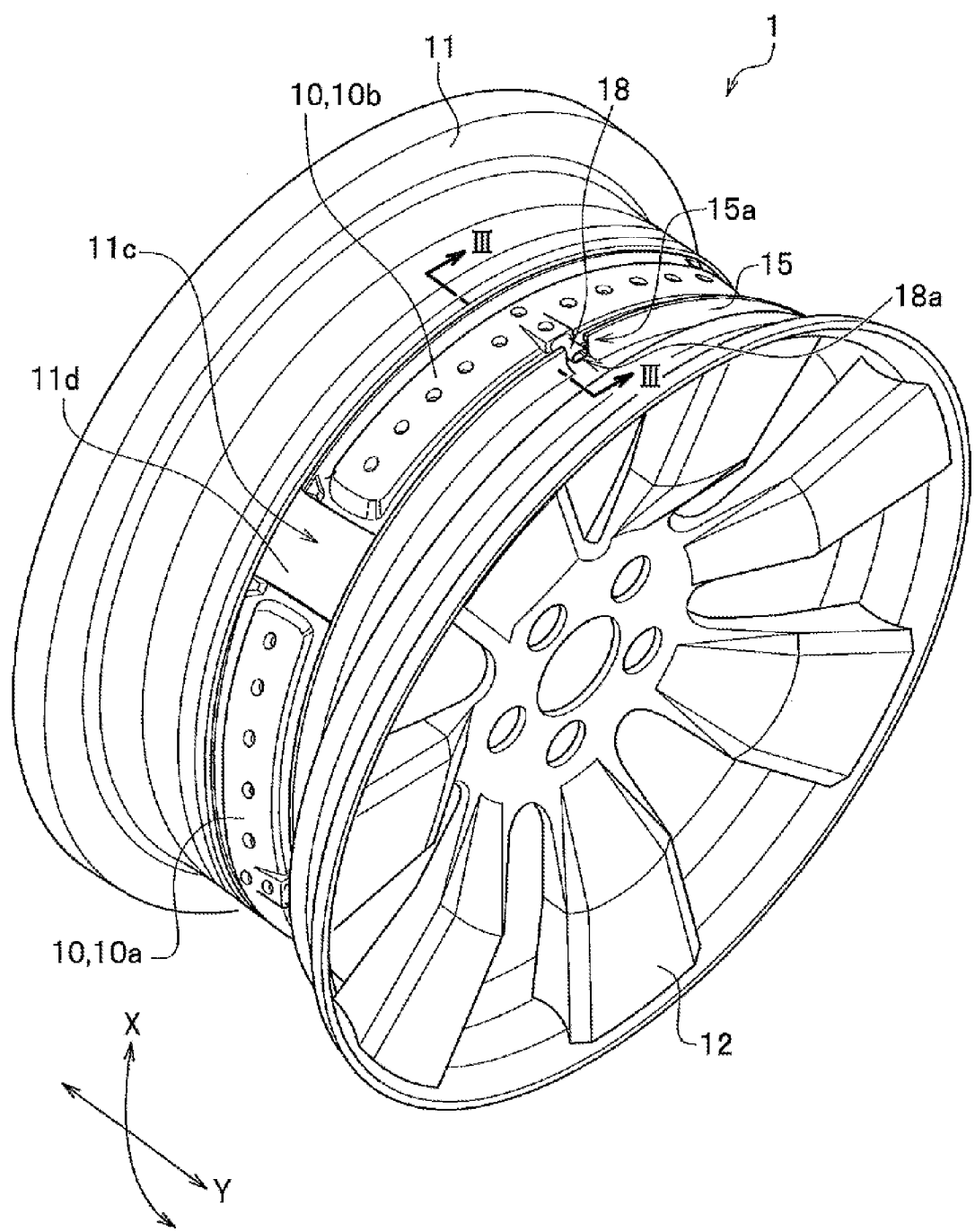
FIG. 1 is a perspective view of a vehicle wheel in an embodiment according to the present invention.

In the following, an embodiment according to the present invention will be described below in detail, referring to the drawings, as appropriate.

As shown in FIG. 1, a vehicle wheel 1 in the present embodiment has only two sub air chamber members 10 along the wheel circumferential direction X, as Helmholtz resonators. That is, the vehicle wheel 1 has only a first sub air chamber member 10a and a second sub air chamber member 10b. Both of the first sub air chamber member 10a and the second sub air chamber member 10b correspond to 'a first Helmholtz resonator' and a 'second Helmholtz resonator' set forth in Claims. Arrow of Symbol Y represents the direction of the wheel width.

Incidentally, the first sub air chamber member 10a and the second sub air chamber member 10b have the same structure, and when it is unnecessary to particularly distinguish the first one from the second one, the first sub air chamber member 10a and the second sub air chamber member 10b will be referred to merely as the sub air chamber member 10.

As will be described later in detail, the vehicle wheel 1 is featured by that the respective communication holes 18a of the sub air chamber members 10 are separate from each other by a certain distance along the wheel circumferential direction X. First, the entire structure of the vehicle wheel 1 will be described below.

The vehicle wheel 1 in the present embodiment is provided with a rim 11 and a disc 12 for connecting the rim 11 to a hub (not shown). In FIG. 1, symbol 11d represents the outer circumferential surface of a well portion 11c, and a sub air chamber member 10 is, as described later, fitted into the well portion 11c. Symbol 18 represents a tube body provided with a communication hole 18a, and symbol 15 represents an annular standing wall standing from the outer circumferential surface 11d of the well portion 11c such as to extend in the circumferential direction of the rim 11. Incidentally, the sub air chamber member 10 is as described later engaged and stopped by the standing wall 15. Symbol 15a represents a cut-out portion, of the standing wall 15, into which the tube body 18 is fitted when the sub air chamber member 10 is engaged and stopped by the standing wall 15.

Figure 2:
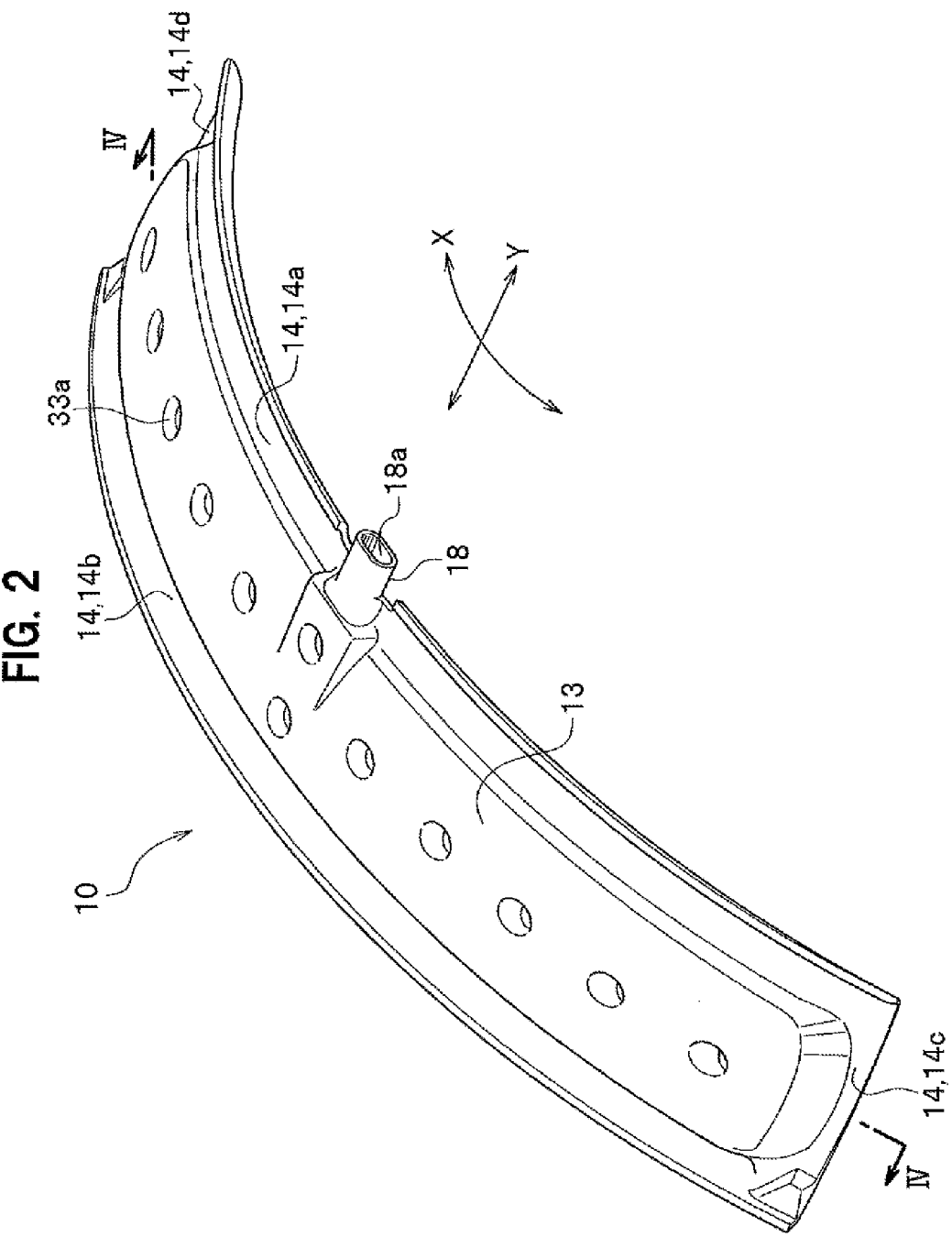
FIG. 2 is an entire perspective view of a sub air chamber member.

FIG. 2 is an entire perspective view of a sub air chamber member 10.

The sub air chamber member 10 is, as shown in FIG. 2, a member which is long in one direction and is provided with a main body portion 13, the tube body 18 with the communication hole 18a, and a fringe portion 14. The longitudinal direction of the sub air chamber member 10 (wheel circumferential direction X) is curved along the outer circumferential surface 11d (see FIG. 1) of the well portion 11c (see FIG. 1). Incidentally, symbol 33a represents upper joint portions described later (see FIG. 3).

Figure 3:
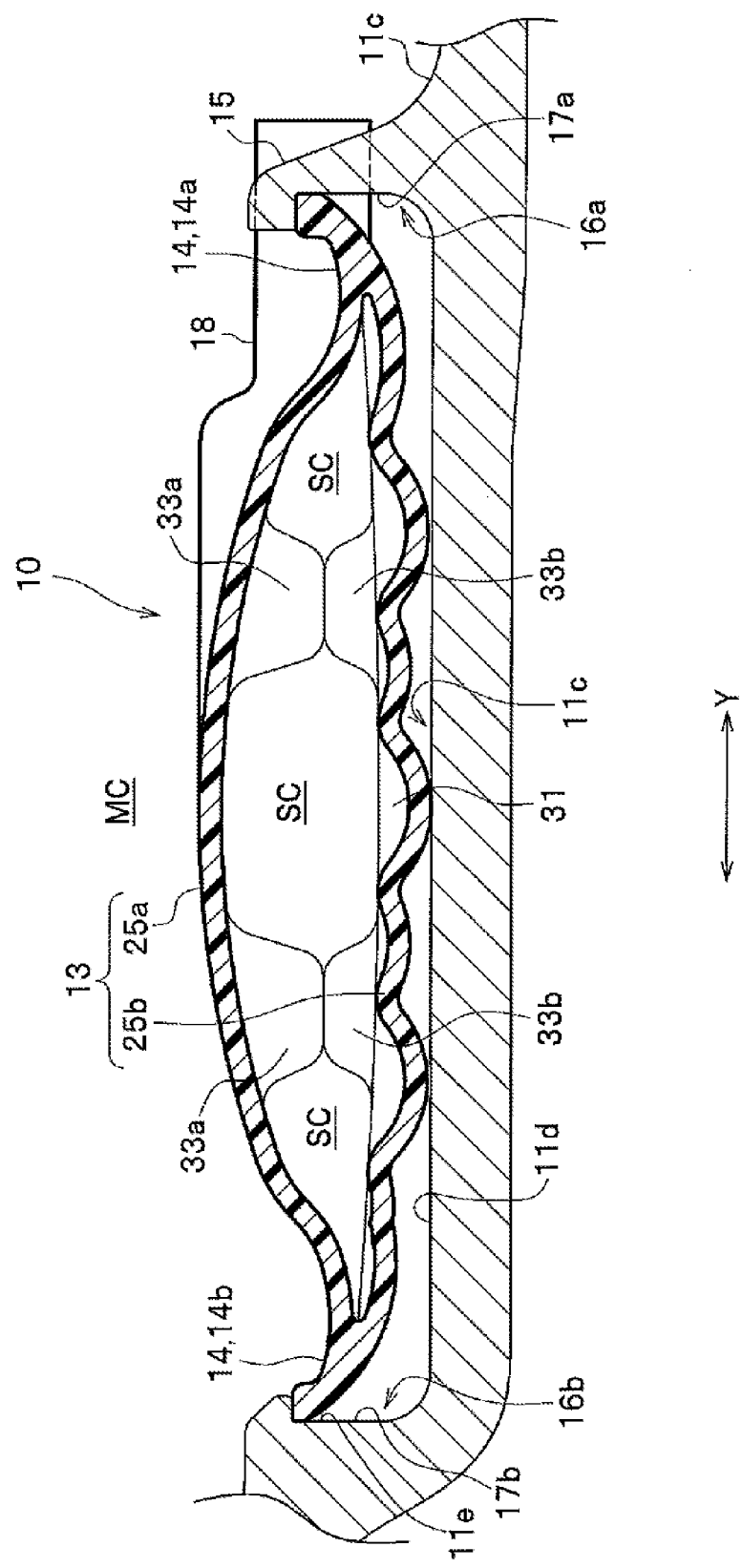
FIG. 3 is a cross-sectional view of the sub air chamber member disposed on a well portion, and is a partial enlarged cross-sectional view taken along III-III in FIG. 1.

FIG. 3 is a cross-sectional view of the sub air chamber member 10 disposed on the well portion 11c, and is a partial enlarged cross-sectional view taken along III-III in FIG. 1.

As shown in FIG. 3, the main body portion 13 of the sub air chamber member 10 is provided with a bottom plate 25b and an upper plate 25a forming a sub air chamber SC between the upper plate 25a and the bottom plate 25b. Incidentally, the upper plate 25a and the bottom plate 25b have the same thickness in the present embodiment, however, may have respective thicknesses different from each other.

The upper plate 25a forms the sub air chamber SC by curving such as to have a bulge above the bottom plate 25b disposed along the outer circumferential surface 11d side of the well portion 11c.

The upper plate 25a is provided with upper joint portions 33a at the part that constructs the main body portion 13. These upper joint portions 33a are formed such that the upper plate 25a is recessed toward the sub air chamber SC side, and are in a circular shape in plan view. As shown in FIG. 2, these upper joint portion 33a are formed in a quantity of ten such as to be arrayed on the center line of the main body portion 13 along the longitudinal direction (wheel circumferential direction X) of the sub air chamber member 10, and are formed in a quantity of two at the position of the tube body 18 such as to be arrayed in the width direction (wheel width direction Y) of the sub air chamber member 10.

Returning to FIG. 3, the bottom plate 25b is provided with bottom-side joint portions 33b at the positions corresponding to the upper joint portions 33a.

These bottom-side joint portions 33b are formed such that the bottom plate 25b is recessed toward the sub air chamber SC side, and are in a circular shape in a plan view. These bottom-side joint portions 33b are integrated at the tip end portions thereof with the tip end portions of the upper joint portions 33a of the upper plate 25a to thus join the upper plate 25a and the bottom plate 25b.

Incidentally, in the present invention, it is also possible to arrange a structure without such upper joint portions 33a and bottom-side joint portions 33b.

Figure 4:
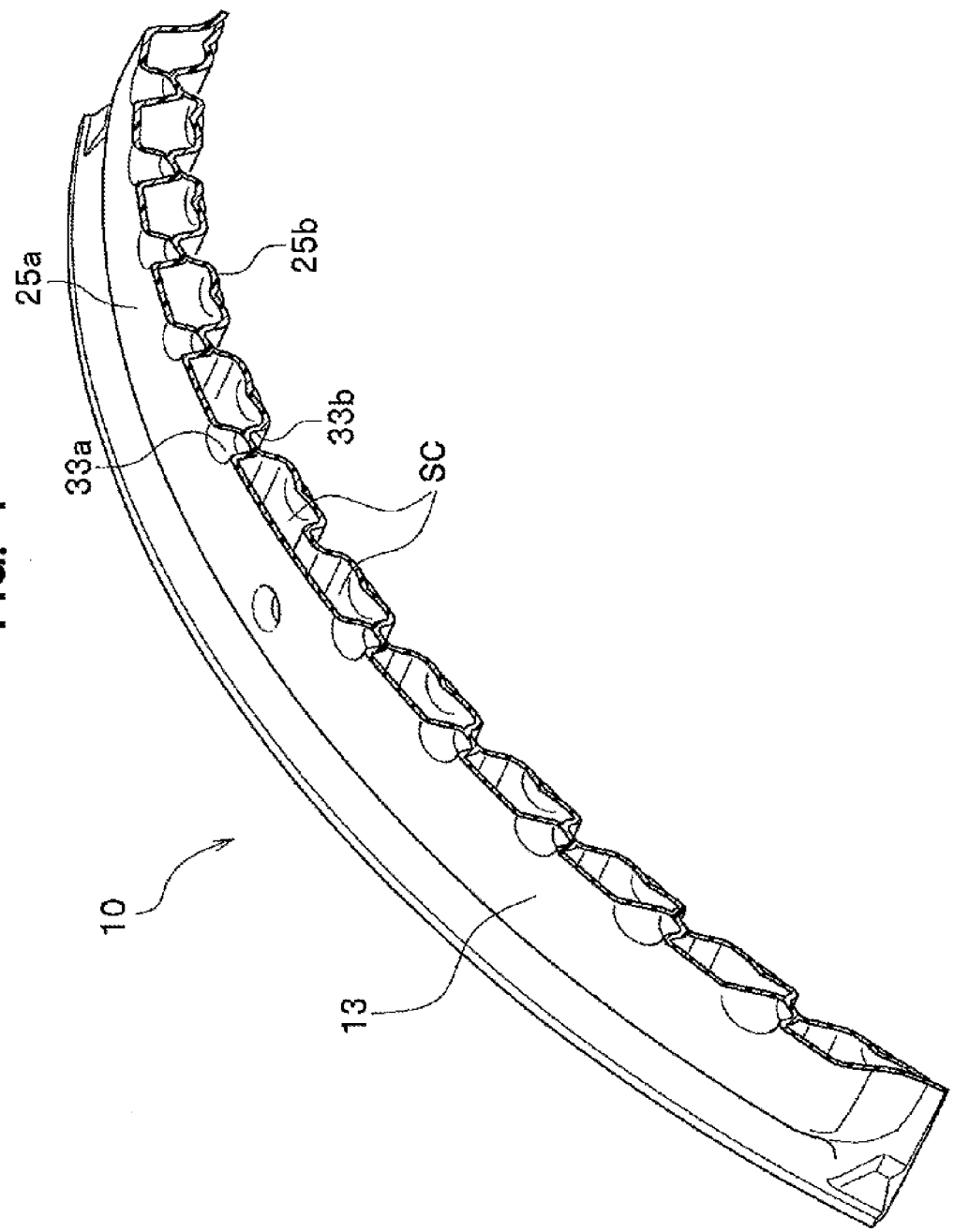
FIG. 4 is a perspective view showing the sub air chamber member cut off by IV-IV in FIG. 2.

FIG. 4 referred to in the following is a cross-sectional perspective view of the sub air chamber member cut off by line IV-IV in FIG. 2.

As shown in FIG. 4, the upper joint portions 33a and the bottom-side joint portions 33b joined with each other in the sub air chamber SC have a structure that improves the mechanical strength of the sub air chamber member 10 and also enables greater effect on a later-described silencing function by reducing variation in the inner volume of the sub air chamber SC.

The inner volume of the sub air chamber SC is desirably 50-250 cc approximately. By setting the inner volume of the sub air chamber SC in this range, the sub air chamber member 10 can enable full effect on silencing and reduction in the weight of the vehicle wheel 1 by reducing an increase in the weight thereof. Further, the length of the sub air chamber member 10 along the wheel circumferential direction X (see FIG. 2) can be appropriately set in consideration of adjusting the weight of the vehicle wheel 1 and easiness in attaching to the well portion 11c, with the length of a half of the circumferential length (the circumferential length of the outer circumferential surface 11d of the well portion 11c) of the rim 11 (see FIG. 1) as the maximum length.

Again returning to FIG. 2, a tube body 18 has a communication hole 18a inside thereof. The tube body 18 is formed at the center of the sub air chamber member 10 in the longitudinal direction (wheel circumferential direction X).

Such a tube body 18 is protruding from the main body portion 13 in the wheel width direction Y.

On the well portion 11c (see FIG. 3), the communication hole 18a make a tire air chamber MC (see FIG. 3), which is formed between the well portion 11c and a tire (not shown), and the sub air chamber SC (see FIG. 3) communicate with each other, and thus constructs a Helmholtz resonator together with the sub air chamber SC of the sub air chamber member 10.

The cross-sectional shape of the communication hole 18a is not particularly limited. In the present embodiment, the cross-sectional shape of the communication hole 18a is elliptical (see FIG. 2), however, may be any one of a circular shape, a polygonal shape, and the like. If the cross-section is circular, the diameter of the communication hole 18a is desirably longer than or equal to 5 mm. If the communication hole 18a has a cross-sectional shape other than a circular shape, the circle of a cross-section in conversion with the same cross-section area desirably has a diameter longer than or equal to 5 mm.

Incidentally, the distance between communication holes 18a described later in detail is defined by the centers of the respective opening portions of the communication holes 18a.

The length of a communication hole 18a is set such as to satisfy an expression for obtaining resonant vibration frequency of a Helmholtz resonator, the expression being described by the following Expression 1.

$$f_0 = C/2\pi \times \sqrt{(S/V(L+\alpha \times \sqrt{S}))}$$ Expression 1

$f_0$ (Hz): resonant vibration frequency
C (m/s): sonic speed inside sub air chamber SC (=sonic speed inside the tire air chamber MC)
V ($m^3$): inner volume of sub air chamber SC
L (m): length of communication hole 18a
S (m2): cross-sectional area of opening portion of communication hole 18a
$\alpha$: correction factor Incidentally, the resonant vibration frequency $f_0$ is made equal to the resonant vibration frequency of the tire air chamber MC.

Tube bodies 18 in the present embodiment, the each tube body 18 having such a communication hole 18a, are fitted to the cut-out portions 15a (see FIG. 1) of the standing wall 15 and thereby have a function as stoppers of rotation of the sub air chamber member 10 along the wheel circumferential direction X (see FIG. 1).

A fringe portion 14 joins the bottom plate 25b and the upper plate 25a, as shown in FIG. 3.

Further, as shown in FIG. 2, the fringe portion 14 is constructed by a fringe portion 14c and a fringe portion 14d extending along the wheel circumferential direction X from the main body portion 13 and a fringe portion 14a and a fringe portion 14b extending in the direction (wheel width direction Y) perpendicular to the wheel circumferential direction X from the main body portion 13. That is, the fringe portion 14 (14a, 14b, 14c, 14d) is formed by a plate shaped body extending out from the main body portion 13 such as to surround the main body portion 13.

As shown in FIG. 3, the respective tip end portions of the fringe portion 14a and the fringe portion 14b, which extend out in the wheel width direction Y (the direction perpendicular to the wheel circumferential direction X in FIG. 2), are fitted in the recessed portion 17a of the first standing wall surface 16a and the recessed portion 17b of the second standing wall surface 16b.

The fringe portion 14a and the fringe portion 14b, which respectively extends toward the first standing wall surface 16a and the second standing wall surface 16b are, as described above, integrated with the curved bottom plate 25b to form a curved surface which is convex on the outer circumferential surface 11d side of the well portion 11c.

The thickness of the fringe portion 14 (14a, 14b, 14c, 14d) in the above-described embodiment is set substantially the same as the thickness of the bottom plate 25b and the upper plate 25a. The thickness and the material of these fringe portions 14a, 14b, 14c, and 14d are appropriately selected to thereby have spring elasticity.

The sub air chamber member 10 in the above-described embodiment is assumed to be a resin molding, however, without being limited thereto, the sub air chamber member 10 may be formed from other materials such as metal. Incidentally, in a case of resin molding, in consideration of weight saving, improvement in mass-productivity, reduction in manufacturing cost, ensuring the airtightness of the sub air chamber SC, and the like, a resin that allows blow-molding and is light and highly rigid is desirable. Among them, polypropylene, which is durable against repeated bending fatigue, is particularly desirable.

The rim 11 to which the sub air chamber member 10 is fitted will be described below.

The rim 11 has the well portion 11c, which is recessed toward the inner side (rotation center side) between the bead sheet portions (not shown) of a tire in the wheel radius direction, the bead sheet portions being formed at the both end portions of the tire in the wheel width direction Y shown in FIG. 1.

The well portion 11c is provided in order to put in the bead portions (not shown) of a tire (not shown) in attaching the tire to the rim 11. Incidentally, the well portion 11c in the present embodiment is formed in a cylindrical shape with substantially the same diameter throughout the wheel width direction Y.

The annular standing wall 15 is standing from the outer circumferential surface 11d of this well portion 11c such as to extend along the circumferential direction of the rim 11.

Again referring to FIG. 3, the standing wall 15 is standing such as to form the first standing wall surface 16a standing from the outer circumferential surface 11d of the well portion 11c outward (the upper side in the sheet of FIG. 3, the same hereinafter) in the wheel radius direction.

Further, a side surface portion 11e formed on the inner side (the left side in the sheet of FIG. 3) in the wheel width direction Y of the well portion 11c is provided with the second standing wall surface 16b facing the first standing wall surface 16a. Incidentally, the standing wall 15 in the present embodiment is formed integrally with the well portion 11c in casting the rim 11.

The first standing wall surface 16a and the second standing wall surface 16b are respectively provided with the recessed portion 17a and the recessed portion 17b. The recessed portions 17a and 17b are formed along the circumferential direction of the outer circumferential surface 11d of the well portion 11c and form annular circumferential grooves. The fringe portion 14a and the fringe portion 14b of the sub air chamber member 10 are fitted in the recessed portions 17a and 17b. Incidentally, the recessed portions 17a and 17b in the present embodiment are formed by machining the standing wall 15 and the side surface portion 11e respectively.

Figure 5A:
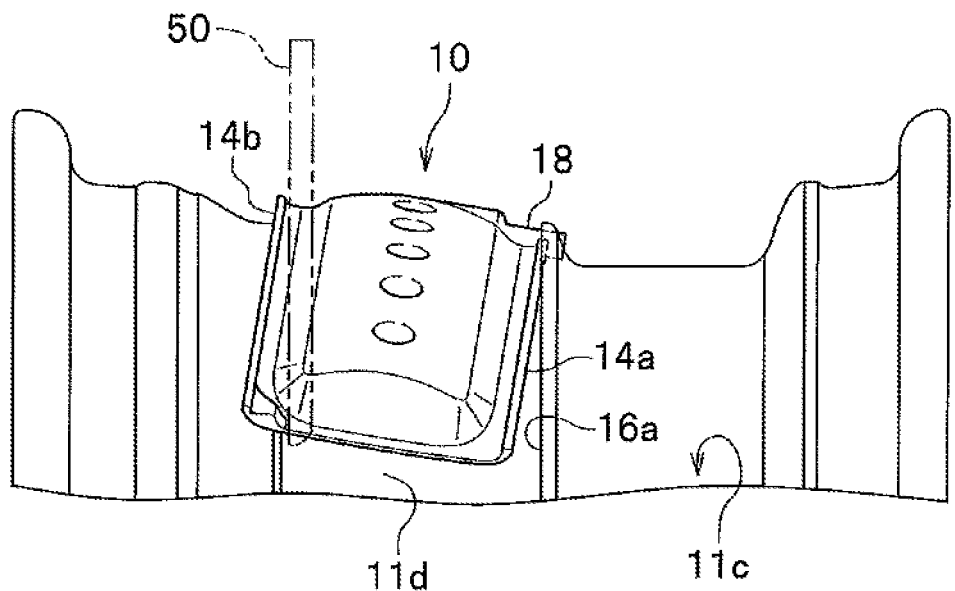
FIGS. 5A and 5B are process illustrations for illustrating a method for fitting the sub air chamber member to the well portion of the rim.
Figure 5B:
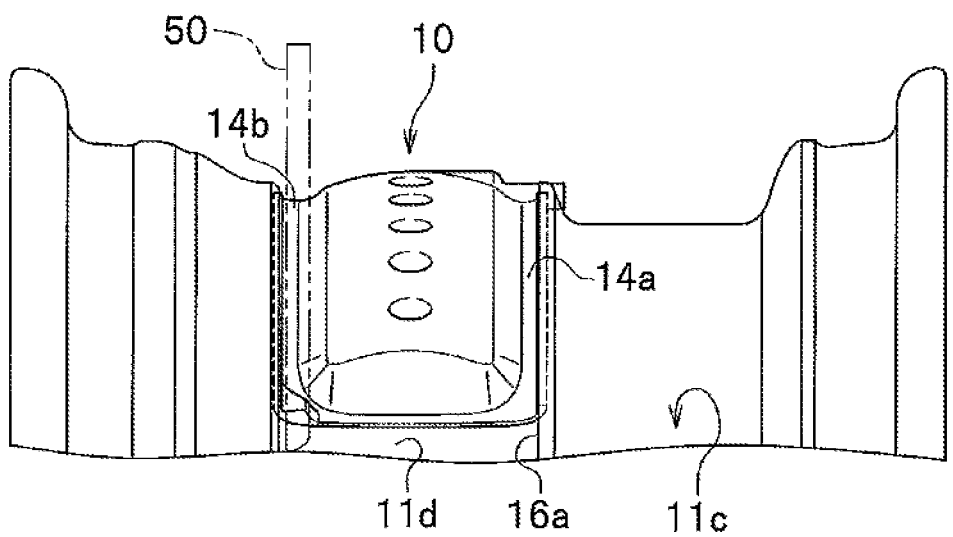

The method of fitting the sub air chamber member 10 to the well portion 11c will be described below. FIGS. 5A and 5B are process illustrations for illustrating a method for fitting the sub air chamber member 10 to the well portion 11c.

Incidentally, fitting of the sub air chamber member 10 to the well portion 11c in the present embodiment assumes using a pusher (pressing device) 50 (see FIGS. 5A and 5B) for pressing the fringe portion 14b at a position close to the recessed portion 17b toward the outer circumferential surface 11d of the well portion 11c.

As the pusher 50, for example, one that presses the fringe portion 14b (see FIGS. 5A and 5B) by the air pressure of an air cylinder can be adopted.

Incidentally, in FIGS. 5A and 5B, the pusher 50 is shown by virtual lines (alternate long and two short dashes lines) for the convenience of drawing.

The pusher 50 used in the present embodiment can be, for example, a plate shaped member provided with an edge portion having an outline in an arc shape with a curvature, in the longitudinal direction (the wheel circumferential direction X in FIG. 2), of the sub air chamber member 10, however, a pusher 50 applicable to the present invention is not limited thereto and can be changed in designing, as appropriate.

In this fitting method, as shown in FIG. 5A, first, the sub air chamber member 10 is inclined, and the fringe portion 14a located in the vicinity of the tube body 18 is partially inserted into the recessed portion 17a (see FIG. 3) of the first standing wall surface 16a. Herein, as shown in FIG. 1, the tube body 18 is fitted into the cut-out portion 15a of the standing wall 15.

Then, in FIG. 5A, the pusher 50 shown by virtual lines is made contact with the fringe portion 14b. Symbol 11d represents the outer circumferential surface of the well portion 11c.

Then, as shown in FIG. 5B, when the pusher 50 presses the fringe portion 14b toward the outer circumferential surface 11d of the well portion 11c, as the inclination angle to the outer circumferential surface 11d of the well portion 11c becomes smaller, the fringe portion 14a of the sub air chamber member 10, the fringe portion 14a being on the both sides sandwiching the tube body 18, is gradually fitted into the recessed portion 17a (see FIG. 3) of the first standing wall surface 16a.

Herein, the fringe portions 14a and 14b having spring elasticity deflect, corresponding to the magnitude of the pressing force of the pusher 50.

Then, when the fringe portion 14b is pressed toward the outer circumferential surface 11d of the well portion 11c, as shown in FIG. 3, the fringe portion 14a and the fringe portion 14b are completely fitted respectively into the recessed portion 17a formed on the first standing wall surface 16a and the recessed portion 17b formed on the second standing wall surface 16b. Thus, the sub air chamber member 10 is fitted to the well portion 11c.

The position of the sub air chamber members 10 (Helmholtz resonator) of the vehicle wheel 1 in the present embodiment will be described below.

Figure 6A:
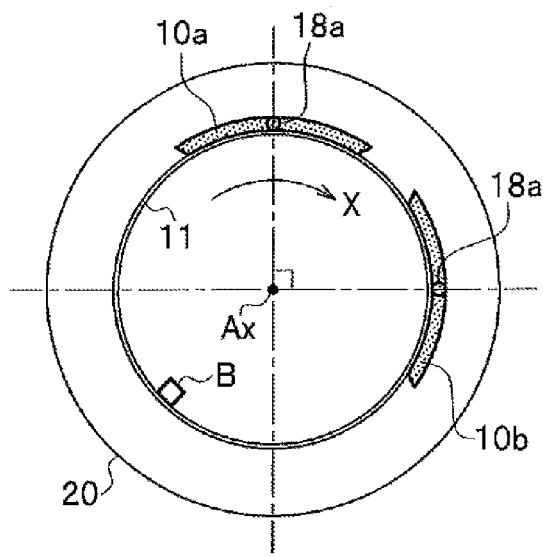
FIGS. 6A to 6C are side views schematically showing the positions of the first sub air chamber member, the second sub air chamber member, and the respective communication holes.
Figure 6B:
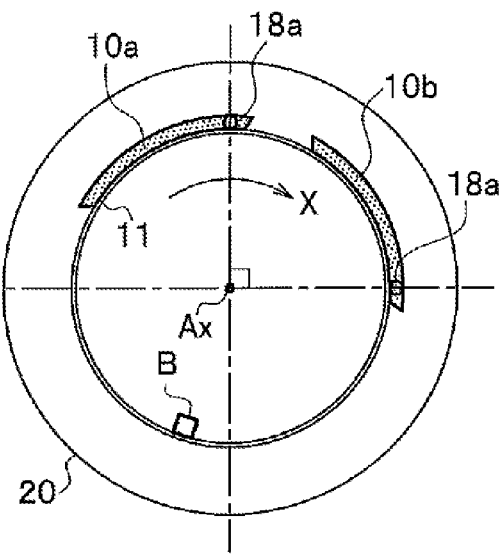
Figure 6C:
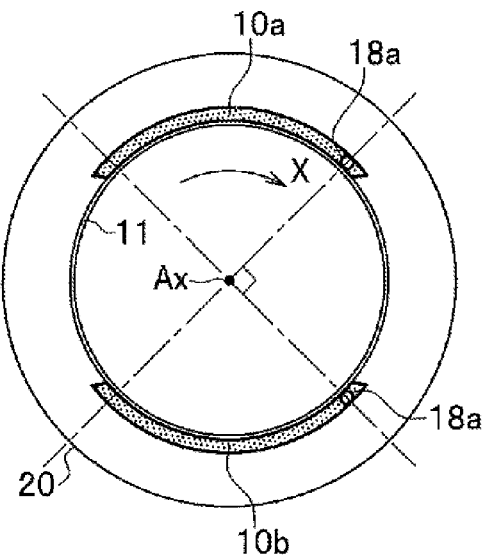

FIGS. 6A to 6C are side views schematically showing the positions of the first sub air chamber member 10a, the second sub air chamber member 10b, and the respective communication holes 18a. In FIGS. 6A to 6C, symbol X represents the wheel circumferential direction, symbol B represents a counter weight for correcting wheel unbalance caused by the first sub air chamber member 10a and the second sub air chamber member 10b, symbol Ax represents the wheel rotation center, symbol 11 represents the rim, and symbol 20 represents a tire tread. FIGS. 7A to 7D are diagrams schematically showing the positions of forming the communication holes 18a, which are schematic cross-sectional views obtained by cutting the sub air chamber members 10 by a curved surface along a curvature in the longitudinal direction.

As shown in FIG. 6A, in the present embodiment, the respective communication holes 18a of the first sub air chamber member 10a (the first Helmholtz resonator) and the second sub air chamber member 10b (the second Helmholtz resonator), which are the only two sub air chamber members disposed along the wheel circumferential direction X, are separated from each other by a certain distance (a certain angle) along the wheel circumferential direction X.

Concretely, the first sub air chamber member 10a and the second sub air chamber member 10b are disposed next to each other along the wheel circumferential direction X, and the respective communication holes 18a, which are formed at the respective centers in the longitudinal direction (wheel circumferential direction X), are disposed such as to be separated from each other by an angle of 90 degrees around the rotation center Ax of the wheel.

Herein, 'a communication hole 18a' refers to the boundary portion at the boundary with the tire air chamber MC (see FIG. 3). Accordingly, 'a communication hole 18a' in the present embodiment refers to the opening portion at the tip end of a tube body 18 (an opening portion having a cross-sectional area represented by S in the above-described Expression 1).

Incidentally, the vehicle wheel 1 in the present embodiment is structured such that the respective communication holes 18a of the first sub air chamber member 10a (the first Helmholtz resonator) and the second sub air chamber member 10b (the second Helmholtz resonator) are separate from each other along the wheel circumferential direction X by an angle of 90 degrees around the rotation center Ax of the wheel, however, without being limited thereto, the separation angle between the communication holes 18a according to the invention can be set in a range of the angle of 90±θ degrees (The value of θ is in a range from 0 to 30, and is desirably in a range from 0 to 10.)

Further, in the present invention, as long as the respective communication hole 18a of the first sub air chamber member 10a and the second sub air chamber member 10b are separate from each other by an angle of 90 degrees, the position where the communication holes 18a of the respective sub air chamber member 10a, 10b are not limited, and the distance between the first sub air chamber member 10a and the second sub air chamber member 10b is neither limited.

Accordingly, in the present invention, as shown in FIG. 6B, arrangement may be made such that the communication hole 18a of the first sub air chamber member 10a is arranged at the end portion of the first sub air chamber member 10a in the wheel circumferential direction X, and the communication hole 18a of the second sub air chamber member 10b is arranged at the end portion of the second sub air chamber member 10b in the wheel circumferential direction X, this end portion being on the side opposite to the side adjacent to the communication hole 18a of the first sub air chamber member 10a.

Yet further, in the present invention, as shown in FIG. 6C, arrangement may be made such that the second sub air chamber member 10b (the second Helmholtz resonator) and the first sub air chamber member 10a (the first Helmholtz resonator) face each other and are separate from each other along the wheel circumferential direction X, with the rotation center Ax of the wheel in between. In this case, arrangement may be made such that the communication hole 18a of the first sub air chamber member 10a is arranged at the end portion of the first sub air chamber member 10a in the wheel circumferential direction X, and the communication hole 18a of the second sub air chamber member 10b is arranged at the end portion of the second sub air chamber member 10b in the wheel circumferential direction X, the end portion being on the side adjacent to the communication hole 18a of the first sub air chamber member 10a.

Figure 7A:
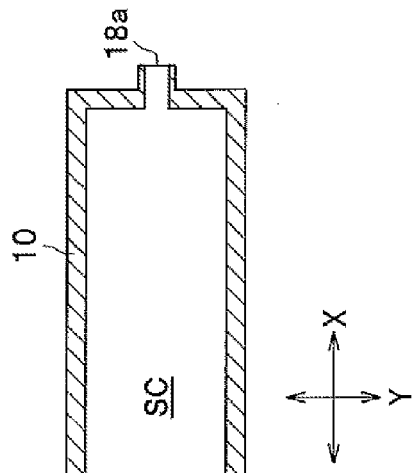
FIGS. 7A to 7D are diagrams schematically showing the positions of forming the communication holes, which are schematic cross-sectional views obtained by cutting the sub air chamber members by a curved surface along a curvature in the longitudinal direction.

Further, although the communication hole 18a shown in FIG. 2 is formed in the tube body 18 protruding from the main body portion 13 in the wheel width direction Y, the position where the communication hole 18a is formed is not particularly limited, as described above. Accordingly, as shown in FIG. 7A, the communication hole 18a can have a structure opening on the upper side of the sub air chamber member 10, in other words, on the upper plate 25a side shown in FIG. 3.

Figure 7B:
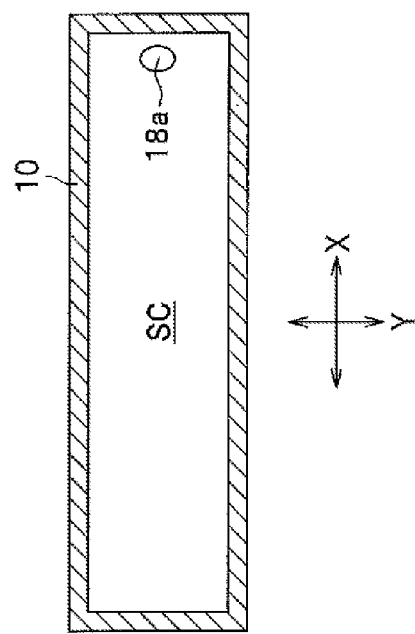
Figure 7C:
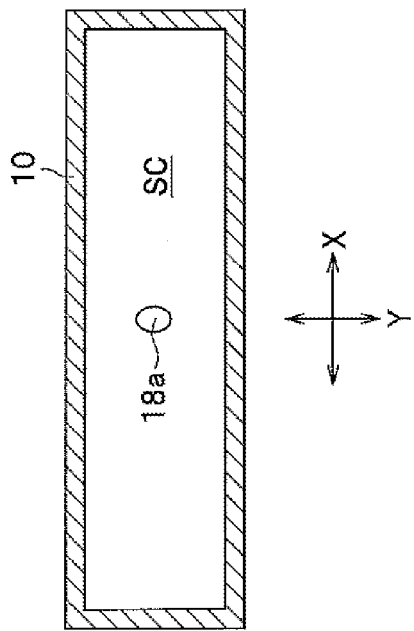
Figure 7D:
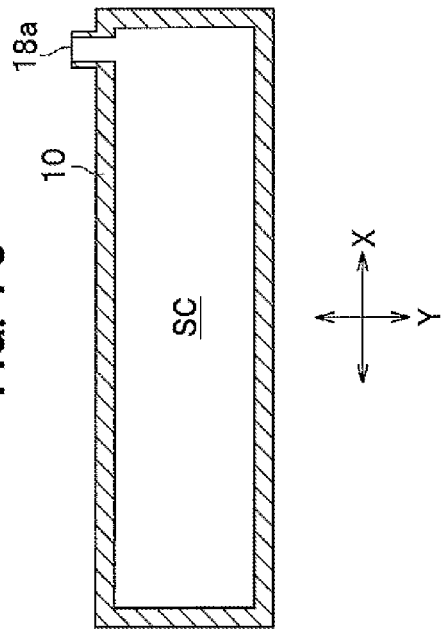

Still further, the communication hole 18a arranged at the end portion of a sub air chamber member 10 may be formed in the wheel circumferential direction X, as shown in FIG. 7B, such as to protrude in the wheel circumferential direction X side, and may be formed, as shown in FIG. 7C, such as to protrude in the wheel width direction Y side. Further, as shown in FIG. 7D, the communication hole 18a may be formed such as to open on the upper side (the upper plate 25a side shown in FIG. 3) of the sub air chamber member 10. Incidentally, symbol SC in FIGS. 7A to 7D represents a sub air chamber.

Further, with the structure of the vehicle wheel 1 in FIG. 6C, wheel unbalance caused by one sub air chamber member out of the first sub air chamber member 10a and the second sub air chamber member 10b is cancelled by the other one sub air chamber member. Accordingly, a counter weight for facing sub air chamber members is unnecessary, which reduces an increase in the weight due to a counter weight used in correcting wheel unbalance of the vehicle wheel 1.

Still further, though not shown, as long as the respective communication holes 18a are separate from each other by a certain angle, as described above, the positions where the respective communication holes 18a are formed are not limited to the central portions or the end portions in the longitudinal direction (the wheel circumferential direction X) of the respective main body portions 13, and can be at respective any positions of the main body portions 13 in the longitudinal position. Yet further, as long as the communication holes 18a are, as described above, separate from each other by a certain angle, the positions of the communication holes 18a may be at respective any positions in the width direction (the wheel width direction Y) of the respective main body portions 13.

The action and advantages of the vehicle wheel 1 in the present embodiment will be described below.

As described above, with a conventional vehicle wheel (for example, refer to Patent Literatures 1 to 3), in order to sufficiently reduce vibration applied by air column resonance sound, more than three Helmholtz resonators are provided at equal intervals along the wheel circumferential direction. On the other hand, in order to reduce the manufacturing cost of a wheel, simplify the manufacturing process of the wheel, and reduce the weight of the wheel, if the quantity of Helmholtz resonators is reduced, it is not possible to sufficiently reduce vibration applied by air column resonance sound, and so-called 'silencing irregularity' is generated.

On the other hand, with the vehicle wheel 1 in the present embodiment, as the advantages of the vehicle wheel 1 have been concretely and clearly described in the embodiment examples, only two sub air chamber members 10 are arranged such that the communication holes 18a are separate from each other, forming an angle of 90 degrees, so that 'silencing irregularity' is not caused, and for example, silencing effect that is substantially the same as the effect of a conventional vehicle wheel having four Helmholtz resonators can be attained. That is, by the vehicle wheel 1 in the present embodiment, it is possible to decrease the quantity of sub air chamber member 10 (Helmholtz resonator) by two compared with a conventional vehicle wheel, and attain an excellent silencing effect without causing 'silencing irregularity'. Thus, by the vehicle wheel 1 in the present embodiment, it is possible to attain reduction in the manufacturing cost, simplification of the manufacturing process, reduction in the wheel weight, and the like, compared with a conventional vehicle wheel.

The present embodiment has been described above, however, the present invention is not limited thereto, and the invention can be carried out in various embodiments.

Although, in the above-described embodiment, it is assumed that the first sub air chamber member 10a and the second sub air chamber member 10b are separate from each other, the invention can adopt a sub air chamber member 10 for which a first sub air chamber member 10a and a second sub air chamber member 10b are integrated with each other.

Figure 8:
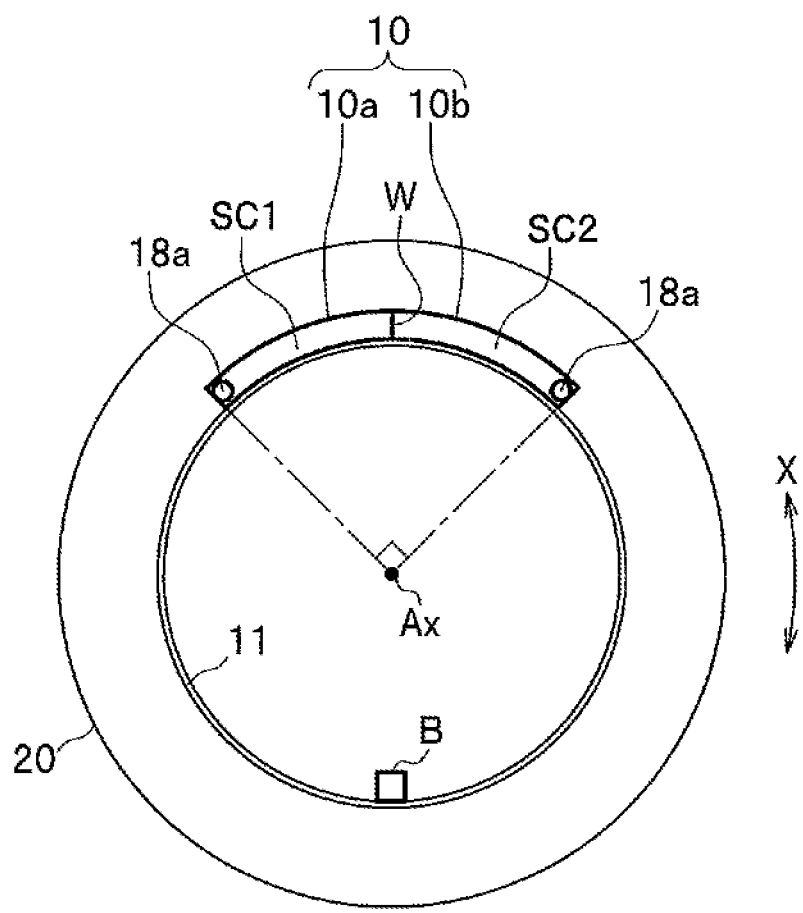
FIG. 8 is a side view schematically showing the positions of the communication holes of the vehicle wheel having the first sub air chamber member and the second sub air chamber, which are integrally formed.
Figure 9A:
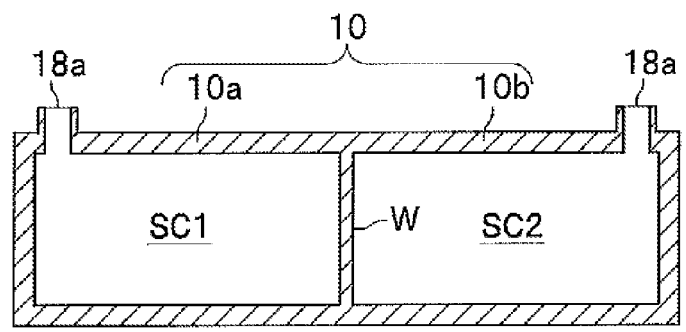
FIGS. 9A to 9C are schematic views of sub air chamber members arranged such that the first sub air chamber and the second sub air chamber are integrated, being next to each other along the wheel circumferential direction with a partitioning wall between them, and are schematic cross-sectional views obtained by cutting the sub air chamber member by a curved surface along the curvature in the longitudinal direction.
Figure 9B:
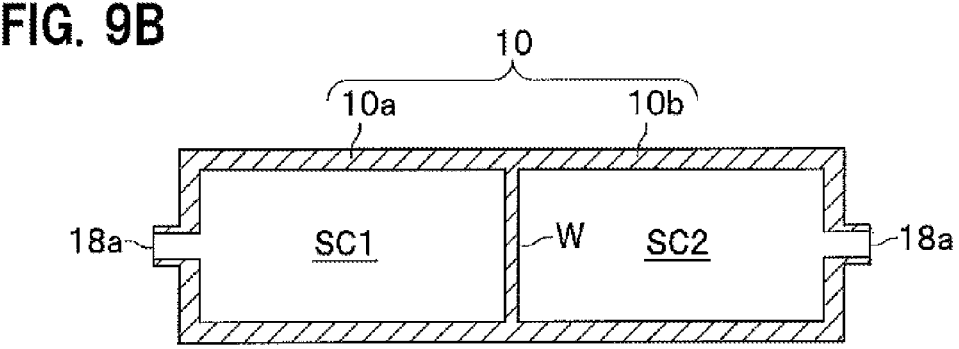
Figure 9C:
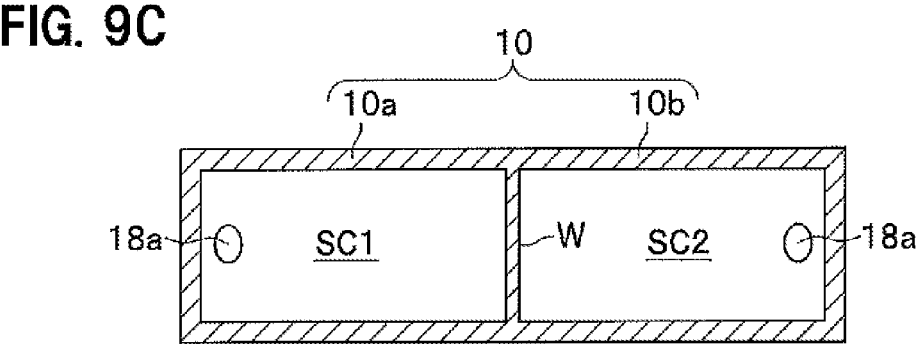

FIG. 8 referred to in the following is a side view schematically showing the positions of the communication holes 18a of the vehicle wheel 1 having a sub air chamber member 10 for which a first sub air chamber member 10a and a second sub air chamber member 10b are integrally formed. In FIG. 8, symbol SC1 represents a first sub air chamber member, symbol SC2 represents a second sub air chamber member, symbol X represents the wheel circumferential direction, symbol Ax represents the wheel rotation center, symbol B represents a counter weight for correcting wheel unbalance caused by the sub air chamber member 10, symbol 11 represents a rim, and symbol 20 represents a tire tread. FIGS. 9A to 9C are diagrams schematically showing the positions forming the respective communication holes 18a of the first sub air chamber member 10a and the second sub air chamber member 10b which are integrated such that the first sub air chamber SC1 and the second sub air chamber SC2 are next to each other along the wheel circumferential direction X with a partitioning wall between them, and are schematic cross-sectional views obtained by cutting the sub air chamber members by a curved surface along the curvature in the longitudinal direction.

As shown in FIG. 8, for this vehicle wheel 1, the first sub air chamber member 10a and the second sub air chamber member 10b are integrally formed, and the first sub air chamber SC1 and the second sub air chamber SC2 are disposed such as to be next to each other along the wheel circumferential direction X through the partitioning wall W. The communication hole 18a which communicates with the first sub air chamber S1 and the communication hole 18a which communicates with the second sub air chamber S2 are, as described above, separated from each other by an angle of 90 degrees around the rotation angle of the wheel.

Further, as shown in FIG. 9A, the respective communication holes 18a can be formed, protruding in the wheel width direction Y, and as shown in FIG. 9B, can also be formed, protruding in the wheel circumferential direction X direction. Further, as shown in FIG. 9C, the communication holes 18a can also be arranged such as to open toward the upper side of the sub air chamber member 10 (the upper plate 25a side shown in FIG. 3).

With this structure of the vehicle wheel 1, as the first sub air chamber member 10a and the second sub air chamber member 10b are integrated with each other, the quantity of components of the vehicle wheel 1 decreases, and a further reduction in the manufacturing cost and simplification of the manufacturing process can be attained, compared with the above-described embodiment. Further, the sub air chamber member 10 in the present embodiment is assumed, as described above, to be a resin molding, wherein compared with the resin amount used in separately forming the first sub air chamber member 10a and the second sub air chamber member 10b, the resin amount used in integrally forming the first sub air chamber member 10a and the second sub air chamber member 10b is smaller. That is, a sub air chamber member formed by integrating a first sub air chamber member 10a and a second sub air chamber member 10b is lighter in weight.

Accordingly, even when the mass of a counter balance B (counter weight) is taken into account, the vehicle wheel 1 shown in FIG. 8 is lighter in weight than a vehicle wheel for which a first sub air chamber member 10a and a second sub air chamber member 10b are separated from each other. Accordingly, with this vehicle wheel 1, the so-called unspring weight of the vehicle can be reduced.

Figure 10A:
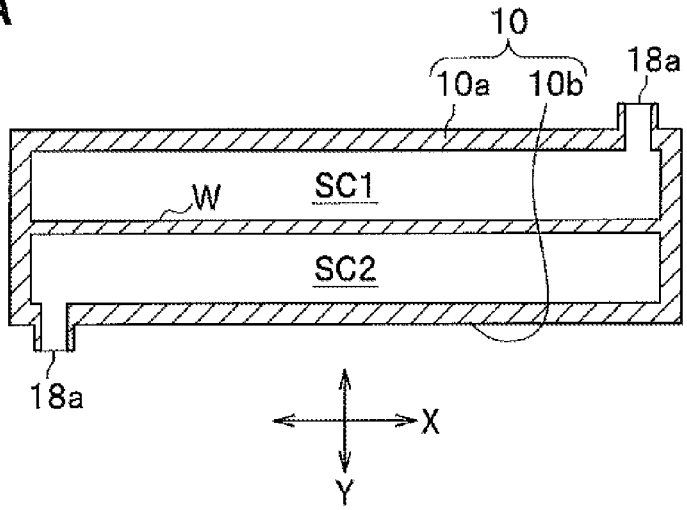
FIGS. 10A to 10C are schematic views of a sub air chamber member formed by integrating the first sub air chamber and the second sub air chamber next to each other in the wheel width direction with a partitioning wall between them, and are schematic cross-sectional views obtained by cutting the sub air chamber member by a curved surface along the curvature in the longitudinal direction.
Figure 10B:
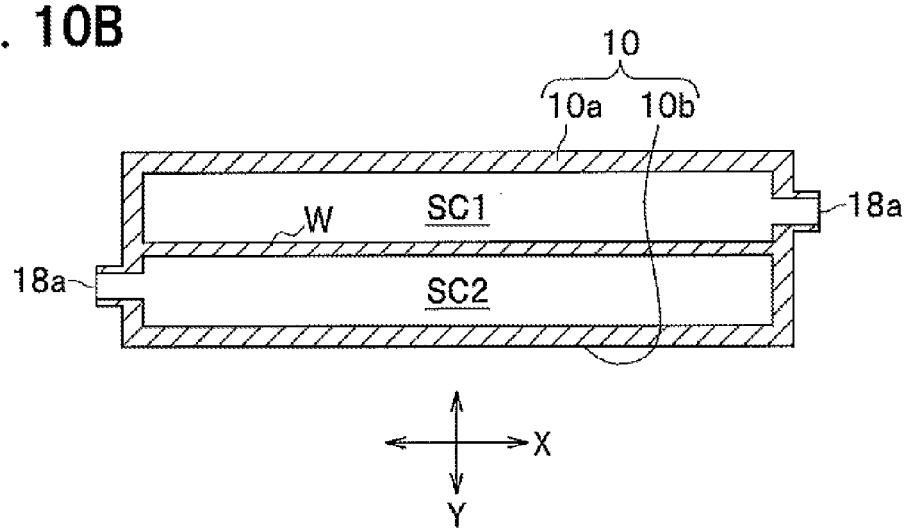
Figure 10C:
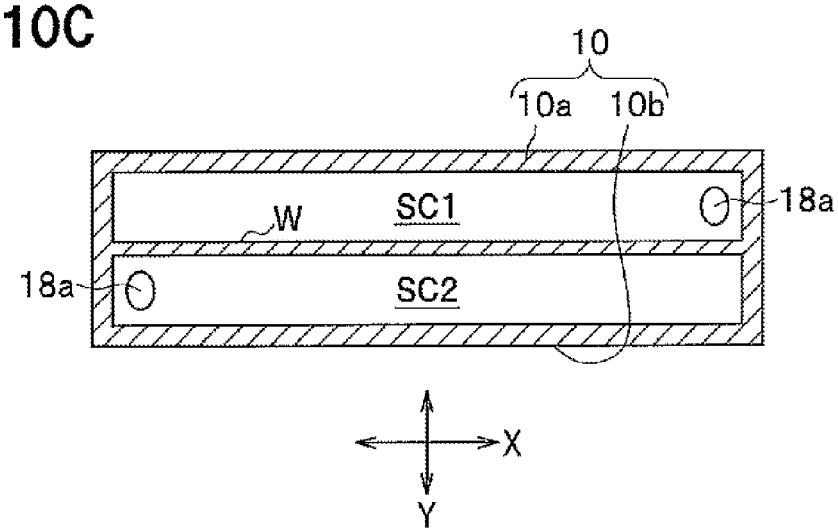

Further, a vehicle wheel 1 according to the present invention is not limited to one for which the first sub air chamber SC1 and the second sub air chamber SC2 are integrated with each other such as to be next to each other in the wheel circumferential direction X through a partitioning wall W. FIGS. 10A to 10C referred to in the following are schematic diagrams showing a sub air chamber member 10 for which a first sub air chamber SC1 and a second sub air chamber SC2 are integrated with each other such as to be next to each other in the wheel width direction Y through a partitioning wall W, and are schematic cross-sectional views obtained by cutting off the sub air chamber member 10 by a curved surface along the curvature in the longitudinal direction.

As shown in FIGS. 10A to 10C, this sub air chamber member 10 is formed such that the first sub air chamber SC1 and the second sub air chamber SC2 are disposed next to each other in the wheel width direction Y through the partitioning wall W.

With such a structure of the sub air chamber member 10, as the partitioning wall W is formed such as to extend along the wheel circumferential direction X, it is possible to further improve the strength of the first sub air chamber member 10a and the second sub air chamber member 10b. Particularly, if a structure without the above-described upper joint portion 33a and the bottom-side joint portion 33b is adopted, the surface rigidity of the upper plate 25a and the bottom plate 25b (see FIG. 3) is improved by this partitioning wall W, as desired.

The communication holes 18a can be formed as shown in FIG. 10A such as to protrude in the wheel width direction Y, and can also be formed as shown in FIG. 10B such as to protrude in the wheel circumferential direction X. Further, as shown in FIG. 10C, the communication holes 18a can be formed such as to open toward the upper side (the upper plate 25a side shown in FIG. 3) of the first sub air chamber member 10a and the second sub air chamber member 10b.

Further, in the above-described embodiment, a vehicle wheel 1 using sub air chamber members 10 fitted to the rim 11 as Helmholtz resonators is assumed, however, in the invention, it is also possible to make a vehicle wheel, arranging a Helmholtz resonator by directly forming sub air chambers and communication holes in the rim 11 itself.

Still further, in the above-described embodiment, the respective communication holes 18a of two sub air chamber members 10 are separate from each other by an angle of 90 degrees around the rotation center of the wheel, however, in the invention, it is also possible to obtain the above-described advantages as long as the angle of the separation of these communication holes is approximately right angle even if not accurately 90 degrees. Concretely, an approximate right angle in the present invention refers to 90±θ degrees (The value of θ is in a range from 0 to 30, and preferably in a range from 0 to 10).

Embodiment Example

The present invention will be concretely described below, describing embodiment examples.

Embodiment Example 1, Referential Example 1, and Referential Example 2

FIG. 11A is a diagram showing the positions of a first sub air chamber member 10a (a first Helmholtz resonator) and a second sub air chamber member 10b (a second Helmholtz resonator) of a vehicle wheel in Embodiment 1 and the separation distance between the communication holes 18a (the separation angle between communication holes), and also showing graphs representing the magnitudes of the vibration accelerations that respond at the wheel rotation center Ax to respective shock loads ($F_0$ to $F_{315}$) input at certain positions along the circumferential direction of a tire tread 20, and FIG. 11B shows a graph representing the one circuit average of vibration accelerations at the wheel rotation center Ax in response to the shock loads ($F_0$ to $F_{315}$) in FIG. 11A.

Incidentally, in FIG. 11A, it will be assumed in the following that the angle of the position at the communication hole 18a of the first sub air chamber member 10a is 0 degree with reference to the rotation center Ax of the wheel in a side view of the vehicle wheel 1 (see FIG. 1). With this assumption, suffixes of symbols $F_0$ to $F_{315}$ represent angles increasing clockwise from the position of the communication hole 18a of the first sub air chamber member 10a. For example, '90' of $F_{90}$ represents the position (angle) increased by 90 degrees clockwise from this communication hole 18a, '180' of $F_{180}$ represents the position (angle) increased by 180 degrees clockwise from this communication hole 18a, and '270' of $F_{270}$ represents the position (angle) increased by 270 degrees clockwise from this communication hole 18a.

The vertical axis of the graphs in FIG. 11A represents the magnitude of the vibration acceleration of the rotation center Ax of the wheel as the magnitude $[(m/s2)/N)]$ of vibration acceleration per vibration input 1N at the time when a shock load is applied (when application of vibration is input) to the tire tread 20 by hitting with a hammer at a position for input of a shock load (applying vibration) represented by symbols from $F_0$ to $F_{315}$, the representation being made with conversion to a unit of [dB]. The horizontal axis of the graphs in FIG. 11A represents a vibration frequency [Hz]. The vertical axis of FIG. 11B represents the one circuit average of the above-described vibration accelerations as the magnitude $[(m/s2)/N)]$ of vibration acceleration per vibration input 1N converted to a unit of [dB], and the horizontal axis in FIG. 11B represents vibration frequency [Hz].

Referential Example 1 has a structure similar to that of the vehicle wheel 1 (see FIG. 1) in the present embodiment except that no sub air chamber member 10 is provided.

As the vehicle wheel in Referential Example 1 is not provided with a sub air chamber member 10, it has no silencing effect against air column resonance sound. Concretely, in the graphs in FIG. 11A, as shown by thin curves, the highest peak sharply appears in the vicinity of the air column resonance vibration frequency (Rf) in response to any vibration application input from $F_0$ to $F_{315}$.

Referential Example 2 has a structure similar to that of the vehicle wheel 1 (see FIG. 1) in the present embodiment except that four sub air chamber members 10 are provided at equal intervals along the wheel circumferential direction X.

FIGS. 12A and 12B are illustrations of a vehicle wheel in Referential Example 2, wherein FIG. 12A is a diagram showing the positions of four sub air chamber members 10 and the separation distances between the communication holes 18a (the separation angles between communication holes), and also showing graphs representing the magnitudes of the vibration accelerations that respond at the wheel rotation center Ax to respective shock loads ($F_0$ to $F_{315}$), and FIG. 12B is a graph representing the one circuit average of vibration accelerations at the wheel rotation center Ax in response to the shock loads ($F_0$ to $F_{315}$) in FIG. 12A. The vertical axes and the horizontal axes of the graphs in FIGS. 12A and 12B are similar to those in FIGS. 11A and 11B.

Incidentally, the thin curved in FIGS. 12A and 12B are copied from the respective thin curves of the graphs in FIGS. 11A and 11B in Referential Example 1.

In the structure of the vehicle wheel in Referential Example 2, as shown in FIG. 12A, four sub air chamber members 10 are disposed at equal intervals over the entire circumference of the wheel. Accordingly, as shown by thick curves in FIG. 12A, satisfactory silencing effect on air column resonance sound is obtained in the vicinity of the air column resonance vibration frequency (Rf) in response to any vibration application input from $F_0$ to $F_{315}$.

Again returning to FIG. 11A, the vehicle wheel 1 (Embodiment Example 1) in the present embodiment has a structure with the quantity of sub air chamber members 10 smaller by two than that in Referential Example 2 (FIG. 12A). Nevertheless, as shown by the thick curves in FIG. 11A, satisfactory silencing effect on air column resonance sound is obtained in the vicinity of the air column resonance vibration frequency (Rf) in response to any vibration application input from $F_0$ to $F_{315}$.

Comparative Example 1

FIGS. 13A and 13B are illustrations of a vehicle wheel in Comparative Example 1, wherein FIG. 13A is a diagram showing the positions of a single air chamber member 10, and also showing graphs representing the magnitudes of the vibration accelerations that respond at the wheel rotation center Ax to respective shock loads ($F_0$ to $F_{315}$), and FIG. 13B is a graph representing the one circuit average of vibration accelerations at the wheel rotation center Ax in response to the shock loads ($F_0$ to $F_{315}$) in FIG. 13A. The vertical axes and the horizontal axes in FIGS. 13A and 13B are similar to those in FIGS. 11A and 11B.

Incidentally, the thin curves in the graphs in FIGS. 13A and 13B are copied from the thin curves in the graphs in FIGS. 11A and 11B in Referential Example 1.

In the structure of the vehicle wheel in Comparative Example 1, as shown in FIG. 13A, as only one sub air chamber member 10 is disposed, satisfactory silencing effect on air column resonance sound is obtained in the vicinity of the air column resonance vibration frequency (Rf) in responses to vibration application inputs of $F_0$ and $F_{180}$, out of responses to vibration application inputs from $F_0$ to $F_{315}$, as shown by thick curves in FIG. 13A.

However, satisfactory silencing effect on air column resonance sound was recognized little on air column resonance sound caused by vibration application inputs of $F_{45}$, $F_{90}$, $F_{135}$, $F_{225}$, $F_{270}$, and $F_{315}$.

Comparative Example 2

FIG. 14A and FIG. 14B are illustrations of Comparative Example 2 wherein FIG. 14A shows a diagram showing the positions of two sub air chamber members 10 and the separation distance between the communication holes 18a (the separation angle between communication holes), and also show graphs representing the magnitudes of the vibration accelerations that respond at the wheel rotation center Ax to respective shock loads ($F_0$ to $F_{315}$), and FIG. 14B shows a graph representing the one circuit average of vibration accelerations at the wheel rotation center Ax in response to the shock loads ($F_0$ to $F_{315}$) in FIG. 14A. The vertical axes and the horizontal axes in FIGS. 14A and 14B are similar to those in FIGS. 11A and 11B.

Incidentally, the thin curves in the graphs in FIGS. 14A and 14B are copied from the thin curves in the graphs in FIGS. 11A and 11B in Referential Example 1.

In the structure of the vehicle wheel in Comparative Example 2, as shown in FIG. 14A, two sub air chamber members 10 are arranged similarly to Embodiment Example 1, however, the separation distance (the separation angle between communication holes) between communication holes 18a was 180 degrees. With the vehicle wheel in Comparative Example 1, satisfactory silencing effect on air column resonance sound is obtained in the vicinity of the air column resonance vibration frequency (Rf) in responses to vibration application inputs of $F_0$ and $F_{180}$, out of responses to vibration application inputs from $F_0$ to $F_{315}$, as shown by thick curves in FIG. 14A.

However, satisfactory silencing effect on air column resonance sound was recognized little on air column resonance sound caused by vibration application inputs of $F_{45}$, $F_{90}$, $F_{135}$, $F_{225}$, $F_{270}$, and $F_{315}$.

Evaluation Results of Embodiment Example 1, Comparative Example 1, and Comparative Example 2

In Comparative Example 1 and Comparative Example 2, as described above, silencing effect was recognized little on air column resonance caused by vibration application inputs of $F_{45}$, $F_{90}$, $F_{135}$, $F_{225}$, $F_{270}$, and $F_{315}$ (see FIG. 13A and FIG. 14A). This is because a sub air chamber member 10 is not provided on the inner circumferential side at the positions of the tire tread 20 to which vibration application is input.

Incidentally, in Comparative Example, although a sub air chamber member 10 is not provided, silencing effect on air column resonance sound caused by vibration application input of $F180$ shown in FIG. 13A was recognized. It is thought that this is because the maximum value of the sound pressure of the primary resonant wave generated in the tire air chamber MC occurs at intervals of 180 degrees, and maximum sound pressure with the same magnitude as the maximum value at the position of 180 degrees is generated also at the position of 0 degree facing the position of 180 degrees with the rotation center Ax of the wheel in between on vibration application input of $F_{180}$, however, as the maximum sound pressure at the position of 0 degree is reduced by the silencing effect of the sub air chamber member 10, the maximum sound pressure at the position of 180 degrees of the same magnitude as that at the position of 0 degree is also reduced.

Compared with this, silencing effect almost the same as that by a structure provided with four sub air chamber members 10 in Referential Example 2 is attained in Embodiment Example 1, without occurrence of silencing irregularity. Concretely, it is of course that silencing effect was confirmed on vibration application input of $F_0$ and $F_{90}$ to portions where the first sub air chamber member 10a and the second sub air chamber member 10b are provided, and silencing effect was confirmed on vibration application input of $F_{180}$ and $F_{270}$ also at the position facing the first sub air chamber member 10a and the second sub air chamber member 10b with the rotation center Ax of the wheel in between despite the fact that sub air chamber members are not arranged at the above-described positions. Further, despite the fact that a sub air chamber member is not arranged on neither of sides sandwiching the rotation center Ax of the wheel, silencing effect was confirmed also on vibration application input of $F_{45}$, $F_{135}$, $F_{225}$, and $F_{315}$.

Figure 15:
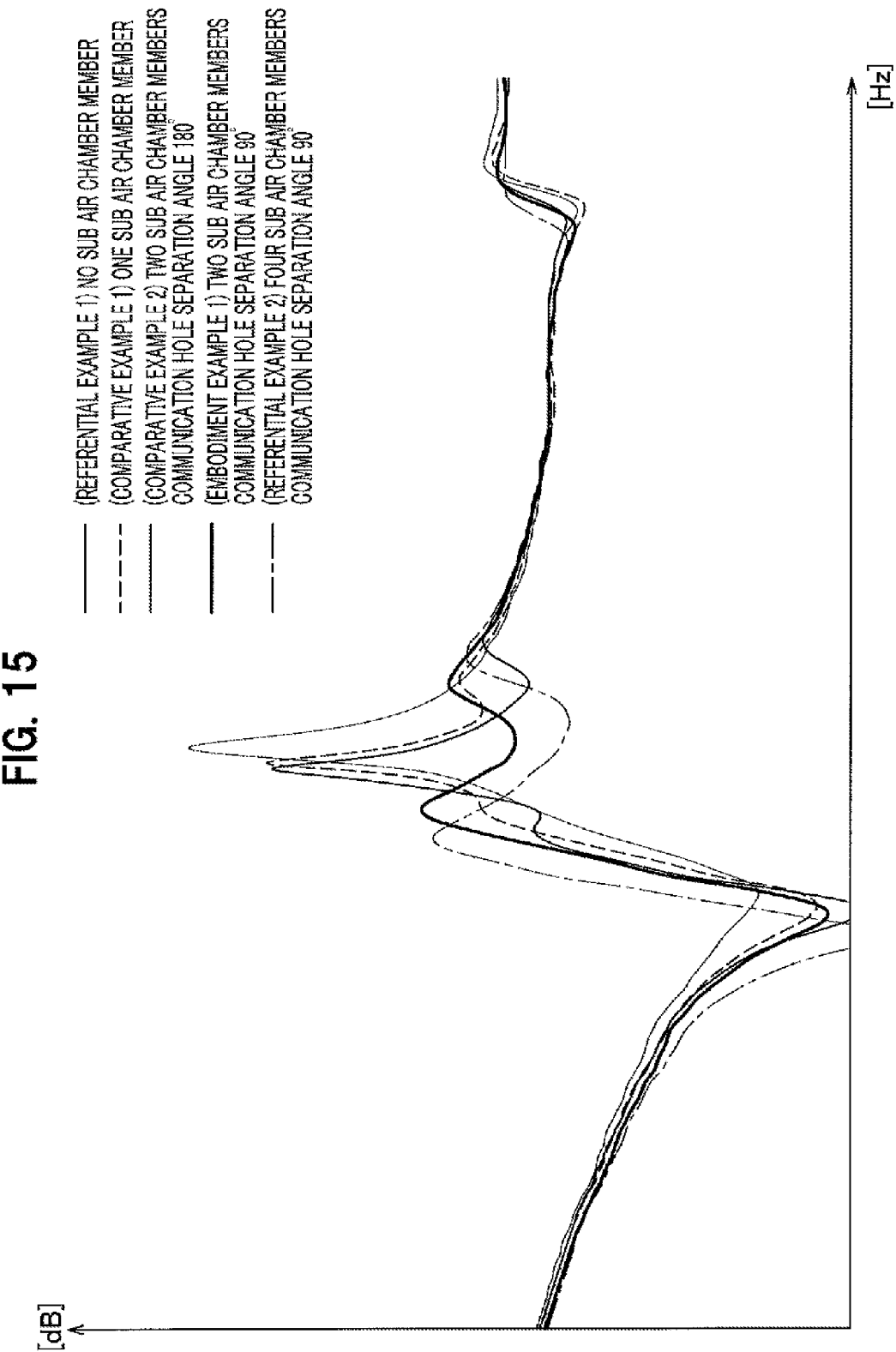
FIG. 15 is a graph showing the graph curves in FIG. 11B, FIG. 12B, FIG. 13B, and FIG. 14B together in one.

FIG. 15 referred to below is a graph showing the graph curves in FIG. 11B, FIG. 12B, FIG. 13B, and FIG. 14B together in one.

As shown in FIG. 15, in comparison of one circuit average of the above-described vibration acceleration, it proved that silencing effect is the most significant in Referential Example 2, and silencing effect is the second most significant in Embodiment Example 1. Further, it was confirmed that silencing effect is insufficient in Comparative Example 1 and Comparative Example 2.

Embodiment Example 2

FIGS. 16A and 16B are illustrations of a vehicle wheel in Embodiment 2, wherein FIG. 16A is a diagram showing the positions of two air chamber members 10 and the separation distance between the communication holes 18a (the separation angle between communication holes), and also showing graphs representing the magnitudes of the vibration accelerations that respond at the wheel rotation center Ax to respective shock loads ($F_0$ to $F_{315}$), and FIG. 16B shows a graph representing the one circuit average of vibration accelerations at the wheel rotation center Ax in response to the shock loads ($F_0$ to $F_{315}$) in FIG. 16A. The vertical axes and the horizontal axes of the graphs in FIGS. 16A and 16B are similar to those in FIGS. 11A and 11B.

Incidentally, the thin curved in FIGS. 16A and 16B are copied from the respective thin curves of the graphs in FIGS. 11A and 11B in Referential Example 1.

A vehicle wheel in Embodiment Example 2 has, as shown in FIG. 16A, a structure provided with communication holes 18a at respective ends of a first sub air chamber member 10a and a second sub air chamber member 10b. In the graphs in FIGS. 16A and 16B, as shown by thick curves, a satisfactory silencing effect which is the same as that in the case of the vehicle wheel shown in FIGS. 11A and 11B in Embodiment Example 1 is obtained also by the vehicle wheel in Embodiment Example 2

DESCRIPTION OF REFERENCE SYMBOLS

1: vehicle wheel
10: sub air chamber member (Helmholtz resonator)
10a: first sub air chamber member (first Helmholtz resonator)
10b: second sub air chamber member (second Helmholtz resonator)
11c: well portion
11d: outer circumferential surface of well portion
13: main body portion
14 (14a, 14b, 14c, 14d): fringe portion
16a: first standing wall surface
16b: second standing wall surface
18a: communication hole
25a: upper plate
25b: bottom plate
X: wheel circumferential direction
Y: wheel width direction
SC: sub air chamber
SC1: first sub air chamber
SC2: second sub air chamber
MC: tire air chamber

The invention claimed is:

1. A vehicle wheel, comprising:
two Helmholtz resonators each having a sub air chamber which communicates with a tire air chamber via a communication hole,
wherein tube bodies each having the communication hole are fitted to cut-out portions of a standing wall and thereby have a function as stoppers of rotation of the Helmholtz resonators along a wheel circumferential direction, and
wherein the respective communication holes of the Helmholtz resonators are arranged to be separated from each other along the wheel circumferential direction, forming a substantially right angle with each other around a wheel rotation center.

2. The vehicle wheel according to claim 1,
wherein the Helmholtz resonators are a first Helmholtz resonator and a second Helmholtz resonator that is disposed to be separated from the first Helmholtz resonator along the wheel circumferential direction such as to face the first Helmholtz resonator around the wheel rotation center,
wherein the communication hole of the first Helmholtz resonator is arranged at an end portion of the first Helmholtz resonator in a circumferential direction, and
wherein the communication hole of the second Helmholtz resonator is arranged at an end portion of the second Helmholtz resonator in the circumferential direction, the end portion being on a side adjacent to the communication hole of the first Helmholtz resonator.

3. The vehicle wheel according to claim 1,
wherein the Helmholtz resonators are formed such that the first Helmholtz resonator and the second Helmholtz resonator are integrated with each other.

4. The vehicle wheel according to claim 3,
wherein the Helmholtz resonators are formed by a sub air chamber member disposed in the tire air chamber,
wherein the inside of the sub air chamber member is partitioned in two chambers to form a first sub air chamber and a second sub air chamber,
wherein the sub air chamber member includes the communication hole via which the first sub air chamber communicates with the tire air chamber and the communication hole via which the second sub air chamber communicates with the tire air chamber,
wherein the first sub air chamber and the communication hole of the first sub air chamber form the first Helmholtz resonator, and
wherein the second sub air chamber and the communication hole of the second sub air chamber form the second Helmholtz resonator.

5. The vehicle wheel according to claim 4,
wherein the Helmholtz resonators are formed by resin such as to be longitudinal in the wheel circumferential direction in a state that the Helmholtz resonators are disposed in the tire air chamber, and
wherein the inside of the sub air chamber member is partitioned such that the first sub air chamber and the second sub air chamber are formed next to each other in a wheel width direction.

* * * * *